US009472097B2

(12) United States Patent
Stelzig et al.

(10) Patent No.: US 9,472,097 B2
(45) Date of Patent: Oct. 18, 2016

(54) ROADWAY SENSING SYSTEMS

(71) Applicant: Image Sensing Systems, Inc., St. Paul, MN (US)

(72) Inventors: Chad Stelzig, Savage, MN (US); Kiran Govindarajan, Eden Prairie, MN (US); Cory Swingen, Arden Hills, MN (US); Roland Miezianko, Bloomington, MN (US); Nico Bekooy, Welwyn Garden City (GB)

(73) Assignee: Image Sensing Systems, Inc., St. Paul, MN (US)

( * ) Notice: Subject to any disclaimer, the term of this patent is extended or adjusted under 35 U.S.C. 154(b) by 55 days.

(21) Appl. No.: 14/208,775

(22) Filed: Mar. 13, 2014

(65) Prior Publication Data

US 2014/0195138 A1 Jul. 10, 2014

Related U.S. Application Data

(63) Continuation-in-part of application No. 13/704,316, filed as application No. PCT/US2011/060726 on Nov. 15, 2011, now Pat. No. 8,849,554.

(60) Provisional application No. 61/779,138, filed on Mar. 13, 2013, provisional application No. 61/413,764, filed on Nov. 15, 2010.

(51) Int. Cl.
*G01C 21/28* (2006.01)
*G08G 1/01* (2006.01)

(52) U.S. Cl.
CPC ........... *G08G 1/0116* (2013.01); *G08G 1/0133* (2013.01); *G08G 1/0141* (2013.01)

(58) Field of Classification Search
CPC ................................ G08G 1/00; G01S 13/04
USPC ......... 701/117, 118, 119, 143; 340/907, 909, 340/933, 937
See application file for complete search history.

(56) References Cited

U.S. PATENT DOCUMENTS 4,697,185 A 9/1987 Thomas et al.
4,988,994 A 1/1991 Loeven (Continued)

FOREIGN PATENT DOCUMENTS

CN 1940711 A 4/2007
DE 19632252 B4 3/2006

(Continued)

OTHER PUBLICATIONS

International Search Report and Written Opinion from PCT Application Serial No. PCT/US2014/025668, dated Jul. 18, 2014, 11 pages.

(Continued)

*Primary Examiner* — Thomas G Black
*Assistant Examiner* — Wae Louie
(74) *Attorney, Agent, or Firm* — Brooks, Cameron & Huebsch, PLLC

(57) ABSTRACT

A number of roadway sensing systems are described herein. An example of such is an apparatus to detect and/or track objects at a roadway with a plurality of sensors. The plurality of sensors can include a first sensor that is a radar sensor having a first field of view that is positionable at the roadway and a second sensor that is a machine vision sensor having a second field of view that is positionable at the roadway, where the first and second fields of view at least partially overlap in a common field of view over a portion of the roadway. The example system includes a controller configured to combine sensor data streams for at least a portion of the common field of view from the first and second sensors to detect and/or track the objects.

20 Claims, 21 Drawing Sheets

(56) References Cited

U.S. PATENT DOCUMENTS

| | | | | |
|---|---|---|---|---|
| 5,045,937 | A | 9/1991 | Myrick | |
| 5,221,956 | A | 6/1993 | Patterson et al. | |
| 5,239,296 | A | 8/1993 | Jenkins | |
| 5,245,909 | A | 9/1993 | Corrigan et al. | |
| 5,257,194 | A | 10/1993 | Sakita | |
| 5,293,455 | A | 3/1994 | Castelaz | |
| 5,438,361 | A | 8/1995 | Coleman | |
| 5,537,511 | A | 7/1996 | DeAngelis et al. | |
| 5,583,506 | A | 12/1996 | Sinor et al. | |
| 5,617,085 | A | 4/1997 | Tsutsumi et al. | |
| 5,633,946 | A | 5/1997 | Lachinski et al. | |
| 5,661,666 | A | 8/1997 | Pawlak | |
| 5,798,983 | A | 8/1998 | Kuhn et al. | |
| 5,801,943 | A | 9/1998 | Nasburg | |
| 5,850,625 | A | 12/1998 | Maren et al. | |
| 5,893,043 | A | 4/1999 | Moehlenbrink et al. | |
| 5,935,190 | A | 8/1999 | Davis et al. | |
| 5,952,957 | A | 9/1999 | Szu | |
| 5,963,653 | A | 10/1999 | McNary et al. | |
| 6,147,760 | A * | 11/2000 | Geng | G01B 11/2509 356/3.01 |
| 6,266,627 | B1 * | 7/2001 | Gatsonides | G01S 13/582 340/936 |
| 6,449,382 | B1 * | 9/2002 | Ciccolo | G06K 9/209 382/103 |
| 6,499,025 | B1 | 12/2002 | Horvitz et al. | |
| 6,556,916 | B2 * | 4/2003 | Waite | G08G 1/042 340/933 |
| 6,574,548 | B2 * | 6/2003 | DeKock | G08G 1/0104 340/901 |
| 6,580,497 | B1 | 6/2003 | Asaka et al. | |
| 6,590,521 | B1 * | 7/2003 | Saka | G01S 13/931 180/167 |
| 6,670,905 | B1 | 12/2003 | Orr | |
| 6,670,912 | B2 | 12/2003 | Honda | |
| 6,693,557 | B2 * | 2/2004 | Arnold | G01S 13/04 340/928 |
| 6,696,978 | B2 | 2/2004 | Trajkovic et al. | |
| 6,738,697 | B2 | 5/2004 | Breed | |
| 6,771,208 | B2 | 8/2004 | Lutter et al. | |
| 6,903,676 | B1 | 6/2005 | Frady et al. | |
| 6,909,997 | B2 | 6/2005 | Chen et al. | |
| 6,933,883 | B2 | 8/2005 | Isaji | |
| 7,012,560 | B2 | 3/2006 | Braeuchle et al. | |
| 7,027,615 | B2 * | 4/2006 | Chen | G01S 13/867 382/104 |
| 7,049,998 | B1 | 5/2006 | Frady et al. | |
| 7,099,796 | B2 | 8/2006 | Hamza | |
| 7,148,861 | B2 | 12/2006 | Yelton et al. | |
| 7,327,855 | B1 | 2/2008 | Chen | |
| 7,420,501 | B2 | 9/2008 | Perl | |
| 7,427,930 | B2 * | 9/2008 | Arnold | G01S 13/04 340/933 |
| 7,454,287 | B2 | 11/2008 | Manor | |
| 7,460,951 | B2 | 12/2008 | Altan et al. | |
| 7,474,259 | B2 * | 1/2009 | Manor | G01S 7/35 340/905 |
| 7,532,152 | B1 | 5/2009 | Yonak | |
| 7,536,365 | B2 | 5/2009 | Aboutalib | |
| 7,541,943 | B2 | 6/2009 | Manor | |
| 7,558,536 | B2 | 7/2009 | Manor | |
| 7,558,762 | B2 | 7/2009 | Owechko et al. | |
| 7,573,400 | B2 | 8/2009 | Arnold et al. | |
| 7,576,681 | B2 | 8/2009 | Chen et al. | |
| 7,610,146 | B2 | 10/2009 | Breed | |
| 7,639,841 | B2 | 12/2009 | Zhu et al. | |
| 7,643,066 | B2 | 1/2010 | Hanninger, III et al. | |
| 7,647,180 | B2 | 1/2010 | Breed | |
| 7,688,224 | B2 | 3/2010 | Teffer et al. | |
| 7,706,978 | B2 | 4/2010 | Schiffmann et al. | |
| 7,710,257 | B2 | 5/2010 | Miller | |
| 7,715,591 | B2 * | 5/2010 | Owechko | G06K 9/00201 382/104 |
| 7,729,841 | B2 | 6/2010 | Knoop et al. | |
| 7,768,427 | B2 * | 8/2010 | Manor | G01S 13/91 340/904 |
| 7,791,501 | B2 | 9/2010 | Ioli | |
| 7,796,081 | B2 | 9/2010 | Breed | |
| 7,889,098 | B1 * | 2/2011 | Arnold | G01S 13/42 340/907 |
| 7,991,542 | B2 * | 8/2011 | Giles | G08G 1/0104 340/907 |
| 7,999,721 | B2 | 8/2011 | Orr | |
| 8,339,282 | B2 * | 12/2012 | Noble | G06K 9/325 340/425.5 |
| 8,849,554 | B2 * | 9/2014 | Aubrey | G08G 1/00 340/933 |
| 2004/0135703 | A1 * | 7/2004 | Arnold | G01S 13/04 340/933 |
| 2006/0091654 | A1 | 5/2006 | DeMersseman et al. | |
| 2006/0125919 | A1 | 6/2006 | Camilleri et al. | |
| 2006/0202886 | A1 | 9/2006 | Mahapatra et al. | |
| 2007/0016359 | A1 | 1/2007 | Manor | |
| 2007/0030170 | A1 * | 2/2007 | Manor | G01S 13/91 340/933 |
| 2007/0055446 | A1 | 3/2007 | Schiffmann et al. | |
| 2007/0247334 | A1 | 10/2007 | Gebert | |
| 2008/0040004 | A1 | 2/2008 | Breed | |
| 2008/0094250 | A1 * | 4/2008 | Myr | G08G 1/04 340/909 |
| 2008/0129546 | A1 | 6/2008 | Manor | |
| 2008/0150762 | A1 | 6/2008 | Versavel | |
| 2008/0150786 | A1 | 6/2008 | Breed | |
| 2008/0167821 | A1 | 7/2008 | Breed | |
| 2008/0175438 | A1 | 7/2008 | Alves | |
| 2008/0285803 | A1 | 11/2008 | Madsen | |
| 2008/0300776 | A1 | 12/2008 | Petrisor et al. | |
| 2009/0030605 | A1 | 1/2009 | Breed | |
| 2009/0135050 | A1 | 5/2009 | Yonak | |
| 2009/0147238 | A1 | 6/2009 | Markov et al. | |
| 2009/0219172 | A1 | 9/2009 | Wilbrod | |
| 2009/0292468 | A1 | 11/2009 | Wu et al. | |
| 2009/0309785 | A1 * | 12/2009 | Nalezinski | G01S 7/021 342/200 |
| 2010/0164706 | A1 | 7/2010 | Jeng et al. | |
| 2010/0191391 | A1 | 7/2010 | Zeng | |
| 2010/0191461 | A1 | 7/2010 | Zeng | |
| 2010/0235129 | A1 | 9/2010 | Sharma et al. | |
| 2010/0253541 | A1 | 10/2010 | Seder et al. | |
| 2010/0253597 | A1 | 10/2010 | Seder et al. | |
| 2010/0256836 | A1 | 10/2010 | Mudalige | |
| 2010/0256852 | A1 | 10/2010 | Mudalige | |
| 2013/0069765 | A1 | 3/2013 | Noble et al. | |
| 2013/0151135 | A1 * | 6/2013 | Aubrey | G08G 1/00 701/118 |
| 2014/0195138 | A1 * | 7/2014 | Stelzig | G08G 1/0116 701/119 |

FOREIGN PATENT DOCUMENTS

| | | | |
|---|---|---|---|
| EP | 0761522 | A1 | 3/1997 |
| EP | 0811855 | A2 | 12/1997 |
| JP | 2004205398 | A | 7/2004 |
| KR | 10-2002-0092046 | A | 12/2002 |
| KR | 20020092046 | A | 12/2002 |
| KR | 10-2005-0075261 | A | 7/2005 |
| KR | 20050075261 | A | 7/2005 |
| RU | 2251712 | C1 | 5/2005 |
| RU | 2381416 | C2 | 2/2010 |
| WO | WO2010/042483 | A1 | 4/2010 |

OTHER PUBLICATIONS

First Office Action and Search Report for CN Application No. 201180031922.3, dated Dec. 3, 2014, 5 pages.

"Vehicle Detection", from http://www.mobileye.com/manufacturer-products/applications/forwa . . . , visited Oct. 11, 2010, 1 page.

"Adaptive Lane Finding in Road Traffic Image Analysis" B.D. Stewart, I. Reading, M.S. Thomson, T.D. Binnie, K.W. Dickinson, C.L. Wan, Napier University, Edinburgh, UK Road Traffic Monitoring and Control, Apr. 26-28, 1994 Conference Publication No. 391, IEE, 1994 pp. 133-136.

(56) References Cited

OTHER PUBLICATIONS

"Computer Vision Algorithms for Intersection Monitoring"; H. Veeraraghavan, O. Masoud, and N.P. Papanikolopoulous, IEEE Transactions on Intelligent Transportation Systems, vol. 4, No. 2, Jun. 2003, pp. 78-89.

Image Sensing Systems, Inc., "Simply Autoscope", 2007, 12 pages.

Jai, "Vehicle Imaging System (VIS"), from http://www.jai.com/EN/Traffic/Products/VehicleImagingSyste . . . , 2007, 2 pages.

Xtralis, "ASIM Dual-tech Detector DT 351", from http://xtralis.com/product_view.cfm?product_id=60, visited Oct. 11, 2010, 1 page.

RTE, "Volvo S60", from http:/www.rte.ie/motors/2010/0615/volvos60.html, visited Oct. 11, 2010, 2 pages.

Xtralis, "ASIM by Xtralis Traffic Detectors—DT 351 Microwave PIR Vehicle Detectors", 2 pages (date unknown).

"Red Light Hold Radar-based system prevents collisions from red light runners", Optisoft The Intelligent Traffic Signal Platform, 2 pages (date unknown).

"Transportation Sensors Optional features for the OptiSoft ITS Platform", Optisoft The Intelligent Traffic Signal Platform, 1 page (date unknown).

"Hidden Markov Model", from http://en.wikipedia.org/wiki/HIdden_markov_model, visited Feb. 22, 2011, 16 pages.

Search Report and Written Opinion from PCT Application Serial No. PCT/US2011/060726, dated Apr. 27, 2012, 9 pages.

* cited by examiner

ROADWAY SENSING SYSTEMS

CROSS-REFERENCE TO RELATED APPLICATIONS

This application claims priority to U.S. Provisional Application No. 61/779,138, filed on Mar. 13, 2013, and is a continuation in part of U.S. patent application Ser. No. 13/704,316, filed Dec. 14, 2012, and PCT Patent Application PCT/US11/60726, filed Nov. 15, 2011, which both claim priority to U.S. Provisional Application No. 61/413,764, filed on Nov. 15, 2010.

BACKGROUND

The present disclosure relates generally to roadway sensing systems, which can include traffic sensor systems for detecting and/or tracking vehicles, such as to influence the operation of traffic control and/or surveillance systems.

It is desirable to monitor traffic on roadways to enable intelligent transportation system controls. For instance, traffic monitoring allows for enhanced control of traffic signals, speed sensing, detection of incidents (e.g., vehicular accidents) and congestion, collection of vehicle count data, flow monitoring, and numerous other objectives. Existing traffic detection systems are available in various forms, utilizing a variety of different sensors to gather traffic data. Inductive loop systems are known that utilize a sensor installed under pavement within a given roadway. However, those inductive loop sensors are relatively expensive to install, replace, and/or repair because of the associated road work required to access sensors located under pavement, not to mention lane closures and/or traffic disruptions associated with such road work. Other types of sensors, such as machine vision and radar sensors are also used. These different types of sensors each have their own particular advantages and disadvantages.

Figure 1:
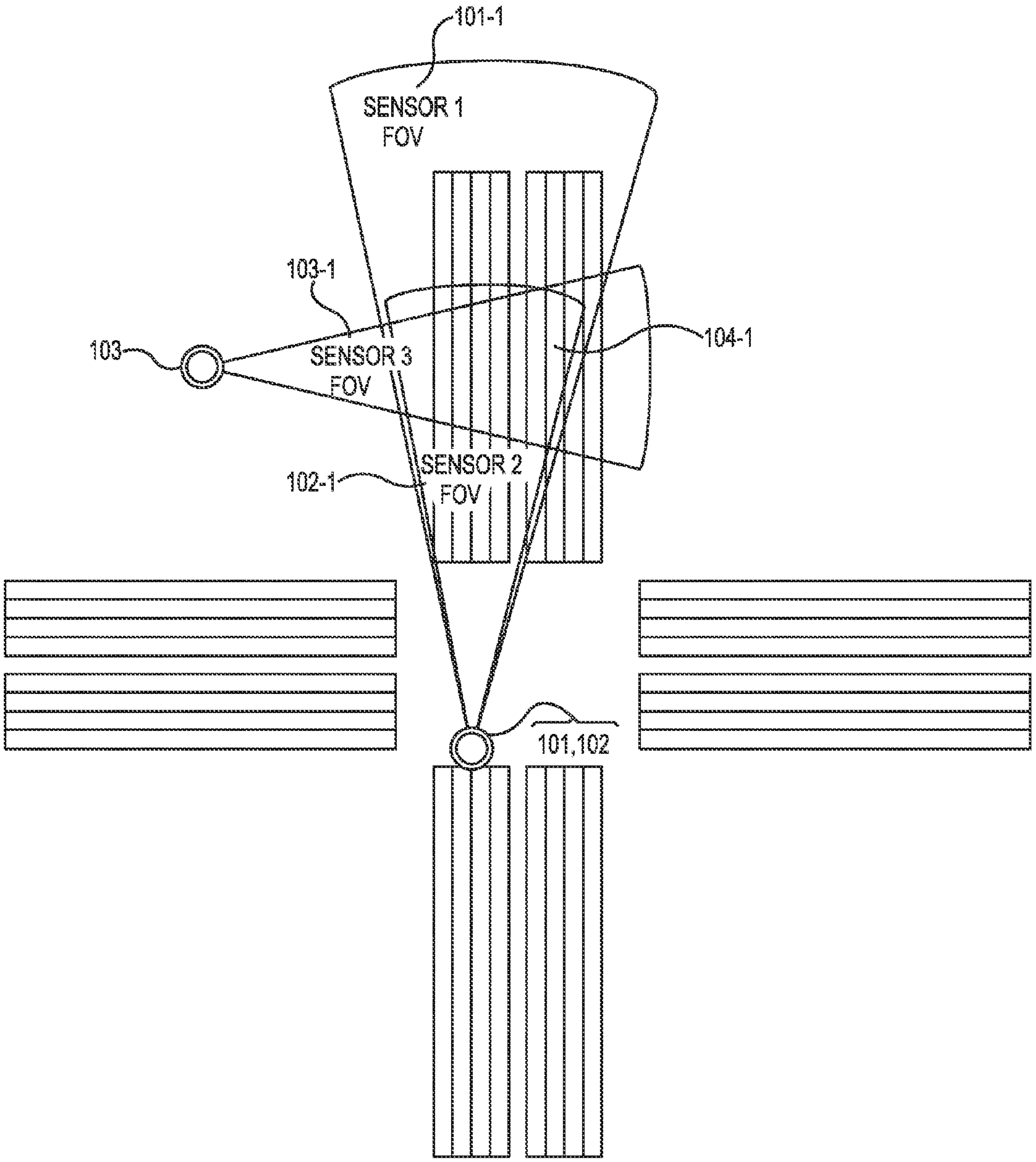
FIG. 1 is a view of an example roadway intersection at which a multi-sensor data fusion traffic detection system is installed according to the present disclosure.

While the above-identified figures set forth embodiments of the present disclosure, other embodiments are also contemplated, as noted in the discussion. This disclosure presents the embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The present disclosure describes various roadway sensing systems, for example, a traffic sensing system that incorporates the use of multiple sensing modalities such that the individual sensor detections can be fused to achieve an improved overall detection result and/or for homography calculations among multiple sensor modalities. Further, the present disclosure describes automated identification of intersection geometry and/or automated identification of traffic characteristics at intersections and similar locations associated with roadways. The present disclosure further describes traffic sensing systems that include multiple sensing modalities for automated transformation between sensor coordinate systems, for automated combination of individual sensor detection outputs into a refined detection solution, for automated definition of intersection geometry, and/or for automated detection of typical and non-typical traffic patterns and/or events, among other embodiments. In various embodiments, the systems can, for example, be installed in association with a roadway to include sensing of crosswalks, intersections, highway environments, and the like (e.g., with sensors, as described herein), and can work in conjunction with traffic control systems (e.g., that operate by execution of machine-executable instructions stored on a non-transitory machine-readable medium, as described herein).

The sensing systems described herein can incorporate one sensing modality or multiple different sensing modalities by incorporation of sensors selected from radar (RAdio Detection And Ranging) sensors, visible light machine vision sensors (e.g., for analogue and/or digital photography and/or video recording), infrared (IR) light machine vision sensors (e.g., for analogue and/or digital photography and/or video recording), and/or lidar (LIght Detection And Ranging) sensors, among others. The sensors can include any combination of those for a limited horizontal field of view (FOV) (e.g., aimed head-on to cover an oncoming traffic lane, 100 degrees or less, etc.) for visible light (e.g., an analogue and/or digital camera, video recorder, etc.), a wide angle horizontal FOV (e.g., greater than 100 degrees, such as omnidirectional or 180 degrees, etc.) for detection of visible light (e.g., an analogue and/or digital camera, video, etc., possibly with lens distortion correction (unwrapping) of the hemispherical image), radar (e.g., projecting radio and/or microwaves at a target within a particular horizontal FOV and analyzing the reflected waves, for instance, by Doppler analysis), lidar (e.g., range finding by illuminating a target with a laser and analyzing the reflected light waves within a particular horizontal FOV), and automatic number plate recognition (ANPR) (e.g., an automatic license plate reader (ALPR) that illuminates a license plate with visible and/or IR light and/or analyzes reflected and/or emitted visible and/or IR light in combination with optical character recognition (OPR) functionality), among other types of sensors.

Various examples of traffic sensing systems as described in the present disclosure can incorporate multiple sensing modalities such that individual sensor detections can be fused to achieve an overall detection result, which may improve over detection using any individual modality. This fusion process can allow for exploitation of individual sensor strengths, while reducing individual sensor weaknesses. One aspect of the present disclosure relates to individual vehicle track estimates. These track estimates enable relatively high fidelity detection information to be presented to the traffic control system for signal light control and/or calculation of traffic metrics to be used for improving traffic efficiency. The high fidelity track information also enables automated recognition of typical and non-typical traffic conditions and/or environments. Also described in the present disclosure is automated the normalization of disparate sensor coordinate systems, resulting in a unified Cartesian coordinate space.

The various embodiments of roadway sensing systems described herein can be utilized for classification, detection and/or tracking of fast moving, slow moving, and stationary objects (e.g., motorized and human-powered vehicles, pedestrians, animals, carcasses, and/or inanimate debris, among other objects). The classification, detection, and/or tracking of objects can, as described herein, be performed in locations ranging from parking facilities, crosswalks, intersections, streets, highways, and/or freeways ranging from a particular locale, city wide, regionally, to nationally, among other locations. The sensing modalities and electronics analytics described herein can, in various combinations, provide a wide range of flexibility, scalability, security (e.g., with data processing and/or analysis being performed in the "cloud" by, for example, a dedicated cloud service provider rather than being locally accessible to be, for example, processed and/or analyzed), behavior modeling (e.g., analysis of left turns on yellow with regard to traffic flow and/or gaps therein, among many other examples of traffic behavior), and/or biometrics (e.g., identification of humans by their characteristics and/or traits), among other advantages.

There are a number of implementations for such analyses. Such implementations can, for example, include traffic analysis and/or control (e.g., at intersections and for through traffic, such as on highways, freeways, etc.), law enforcement and/or crime prevention, safety (e.g., prevention of roadway-related incidents by analysis and/or notification of behavior and/or presence of nearby mobile and stationary objects), and/or detection and/or verification of particular vehicles entering, leaving, and/or within a parking area, among other implementations.

A number of roadway sensing embodiments are described herein. An example of such includes an apparatus to detect and/or track objects at a roadway with a plurality of sensors. The plurality of sensors can include a first sensor that is a radar sensor having a first FOV that is positionable at the roadway and a second sensor that is a machine vision sensor having a second FOV that is positionable at the roadway, where the first and second FOVs at least partially overlap in a common FOV over a portion of the roadway. The example system includes a traffic controller configured (e.g., by execution of machine-executable instructions stored on a non-transitory machine-readable medium, as described herein) to combine sensor data streams for at least a portion of the common FOV from the first and second sensors to detect and/or track the objects.

Figure 2:
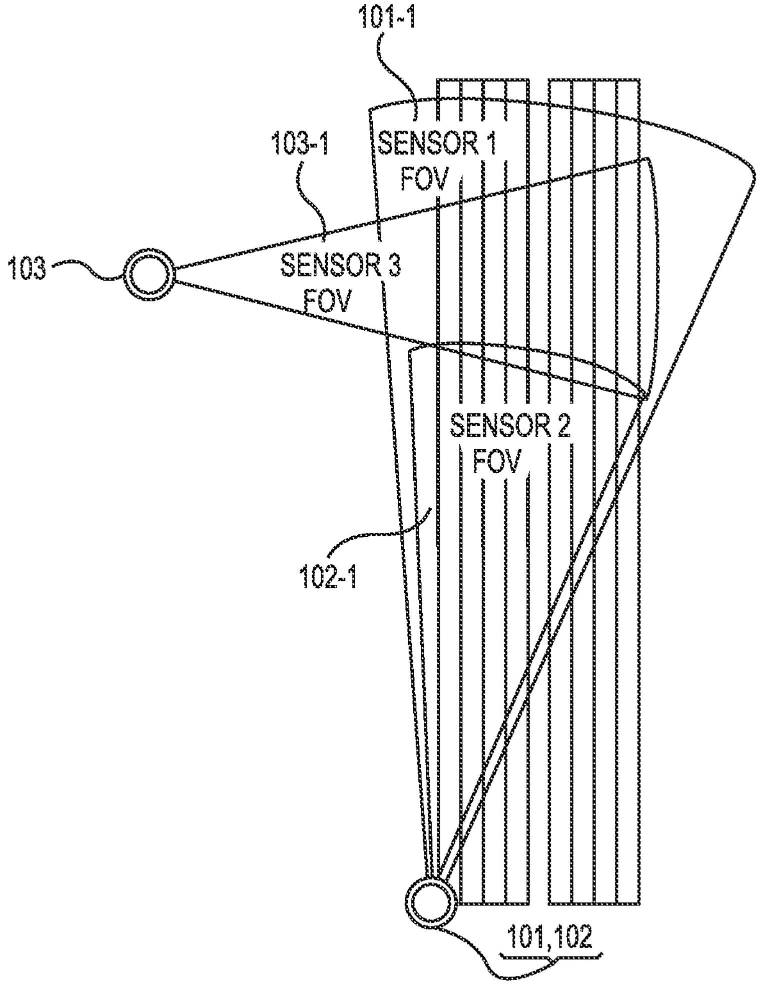
FIG. 2 is a view of an example highway installation at which the multi-sensor data fusion traffic detection system is installed according to the present disclosure.
Figure 3:
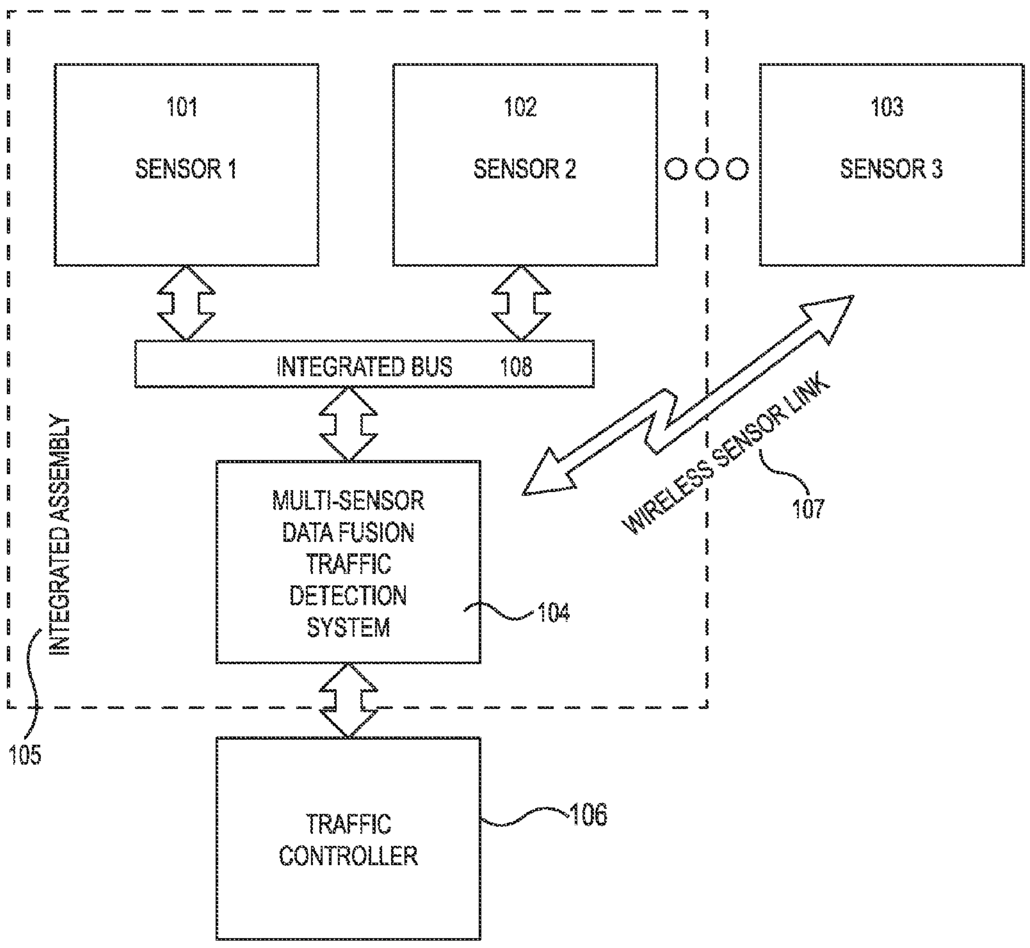
FIG. 3 is a schematic block diagram of an embodiment of the multi-sensor data fusion traffic monitoring system according to the present disclosure.

FIG. 1 is a view of an example roadway intersection at which a multi-sensor data fusion traffic detection system is installed. FIG. 2 is a view of an example highway installation at which the multi-sensor data fusion traffic detection system is installed. FIG. 3 is a schematic block diagram of an embodiment of the multi-sensor data fusion traffic monitoring system.

By way of example in the embodiments illustrated in FIGS. 1, 2, and 3, sensor 1 shown at 101, sensor 2 shown at 102, and a multi-sensor data fusion detection system 104 can be collocated in an integrated assembly 105, and sensor 3 shown at 103 can be mounted outside the integrated assembly 105 to transfer data over a wireless sensor link 107. Sensor 1 and sensor 2 can transfer data via a hard-wired integrated bus 108. Resultant detection information can be communicated to a traffic controller 106 and the traffic controller can be part of the integrated assembly or remote from the integrated assembly. As such, in some embodiments, the multi-sensor data fusion traffic detection system 104 can include an integrated assembly of multiple (e.g., two or more) different sensor modalities and the multi-sensor data fusion traffic detection system 104 can be integrated with a number of external sensors connected via the wireless sensor link 107. In various embodiments described herein, multi-sensor data fusion traffic monitoring systems can include any combination of two or more modalities of sensors, where the sensors can be collocated in the integrated assembly, along with a number of other sensors optionally positioned remote from the integrated assembly.

As described further herein, the multi-sensor data fusion traffic monitoring system just described is just one example of systems that can be used for classification, detection, and/or tracking of objects near a stop line zone (e.g., in a crosswalk at an intersection and/or within 100-300 feet distal from the crosswalk), into a dilemma zone (e.g., up to 300-600 feet distal from the stop line), and on to an advanced detection zone (e.g., greater than 300-600 feet from the stop line). Detection of objects in these different zones can, in various embodiments, be effectuated by the different sensors having different ranges and/or widths for effective detection of the objects (e.g., fields of view (FOVs)). In some embodiments, as shown in FIG. 1, the FOV 101-1 for sensor 1, the FOV 102-1 for sensor 2, and the FOV 103-1 for sensor 3 can overlap to form a common FOV 104-1. Multi-sensor detection systems generally involve a transformation between different coordinate systems for the different types of sensors. The present disclosure addresses this transformation through automated homography calculation. A goal of the automated homography calculation process is to reduce or eliminate involvement of manual selection of corresponding data points from the homography calculation between sensors.

Figure 4A:
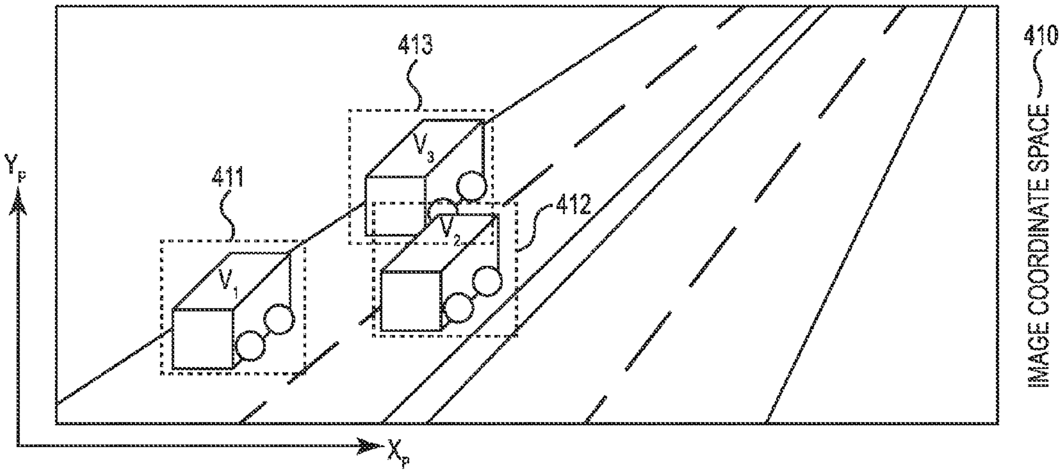
FIGS. 4A and 4B are schematic representations of embodiments of disparate coordinate systems for image space and radar space, respectively, according to the present disclosure.
Figure 4B:
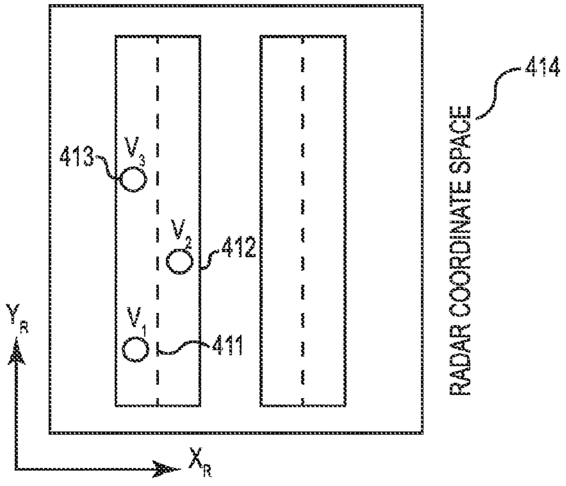

FIGS. 4A and 4B are schematic representations of embodiments of disparate coordinate systems for image space and radar space, respectively, according to the present disclosure. That is, FIG. 4A is a schematic representation of a coordinate system for an image space 410 (e.g., analogue and/or digital photograph, video, etc.) showing vehicle $V_1$ at 411, vehicle $V_2$ at 412, and vehicle $V_3$ at 413. FIG. 4B is a schematic representation of a disparate coordinate system for radar space 414 showing the same vehicles positioned in that disparate space. However, as described herein, any types of sensing modalities can be utilized as desired for particular embodiments.

Figure 5:
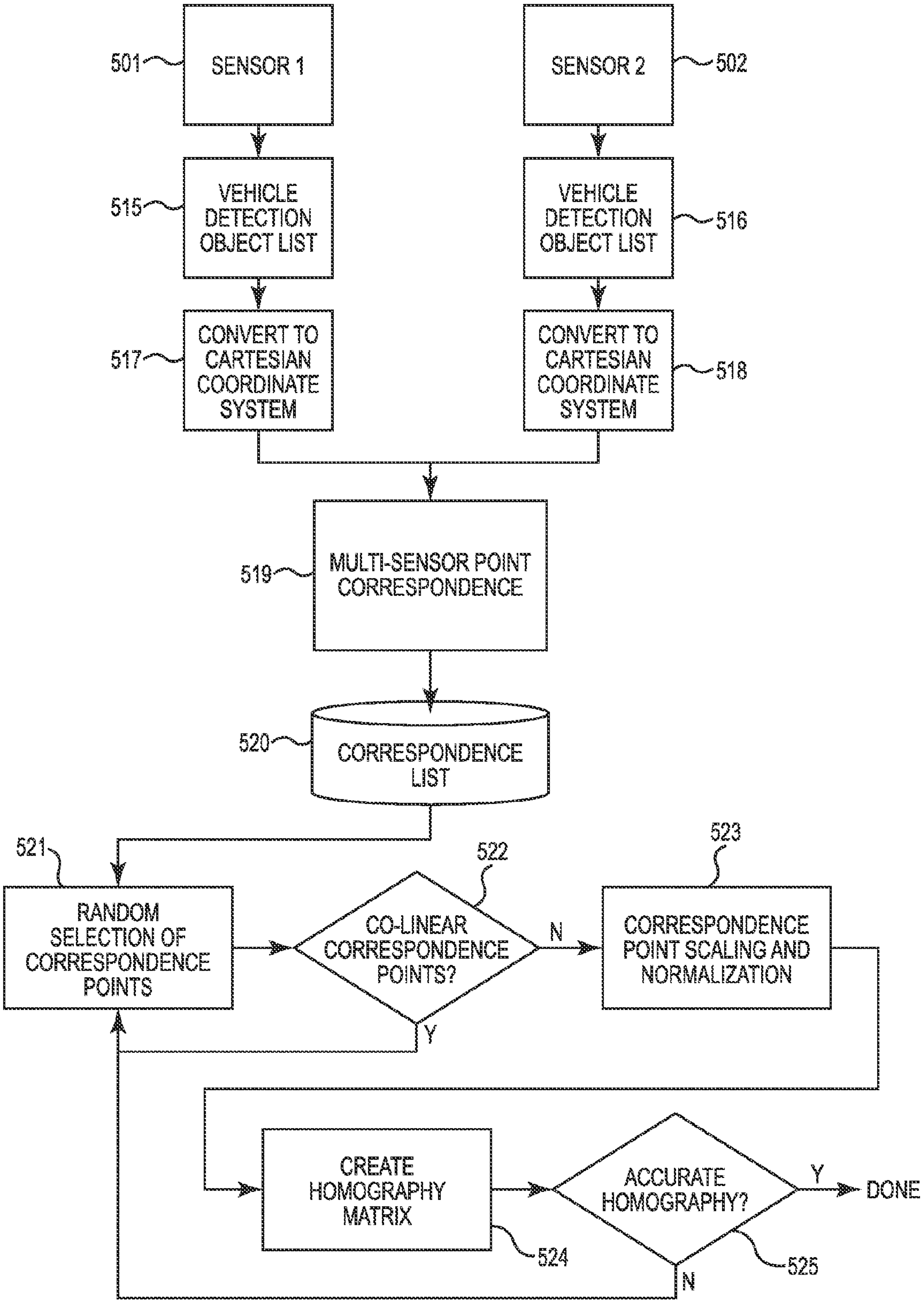
FIG. 5 is a flow chart illustrating an embodiment of automated calculation of homography between independent vehicle detection sensors according to the present disclosure.

FIG. 5 is a flow chart illustrating an embodiment of automated calculation of homography between independent vehicle detection sensors. In one embodiment, the transformation process can be divided into three steps. A first step can be to obtain putative points of interest from each of the sensors (e.g., sensor 501 and 502) that are time synchronized via a common hardware clock. A goal of this step is to produce points of interest from each sensor that reflect the position of vehicles in the scene, which can be accomplished through image segmentation, motion estimation, and/or object tracking techniques and which can be added to object lists 515, 516 for each of the sensors. The points of interest in the object lists for each sensor can be converted and represented as (x,y) pairs in a Cartesian coordinate system 517, 518. The putative points of interest can be generated in real-time and have an associated time stamp via a common hardware clock oscillator. In addition to providing putative points of interest every sample period, motion estimation information can be collected through multi-frame differencing of putative points of interest locations, and nearest neighbor association, to learn and/or maintain a mean motion vector within each sensor. This motion vector can be local to each sensor and utilized for determining matched pairs in the subsequent step.

A second step can be to determine putative correspondences amongst the putative points of interest from each sensor based on spatial-temporal similarity measures 519. A goal of this second step is to find matched pairs of putative points of interest from each sensor on a frame-by-frame basis. Matched pairs of putative points of interest thereby determined to be "points of interest" by such matching can be added to a correspondence list (CL) 520. Matched pairs can be determined through a multi-sensor point correspondence process, which can compute a spatial-temporal similarity measurement among putative points of interest, from each sensor, during every sample time period. For temporal equivalency, the putative points of interest have identical or nearly identical time stamps in order to be considered as matched pairs. Because the putative points of interest from each sensor can share a common timing clock, this information is readily available. Following temporal equivalency, putative points of interest can be further considered for matching if the number of putative points of interest is identical among each sensor. In the case that there is exactly one putative point of interest provided by each sensor, this putative point of interest pair can be automatically elevated to a matched point of interest status and added to the CL. If the equivalent number of putative points of interest from each sensor is greater than one, a spatial distribution analysis can be calculated to determine the matched pairs. The process of finding matched pairs through analysis of the spatial distribution of the putative points of interest can involve a rotation, of each set of putative points of interest, according to their mean motion field vector, a translation such that the centroid of the interest points has the coordinate of (0,0) (e.g., the origin) and scaling such that their average distance from the origin is $\sqrt{2}$. Next, for each potential matched pair a distance can be calculated between the putative points of interest from each set and matched pairs assigned by a Kuhn-Munkres assignment method.

A third step can be to estimate the homography and correspondences that are consistent with the estimate via a robust estimation method for homographies, such as Random Sample Consensus (RANSAC) in one embodiment. After obtaining a sufficiently sized CL, the RANSAC robust estimation can be used in computing a two dimensional homography. First, a minimal sample set (MSS) can be randomly selected from the CL 521. In some embodiments, the size of the MSS can be equal to four samples, which may be the number sufficient to determine homography model parameters. Next, the points in the MSS can be checked to determine if they are collinear 522. If they are collinear, a different MSS is selected. A point scaling and normalization process 523 can be applied to the MSS and the homography computed by a normalized Direct Linear Transform (DLT). RANSAC can check which elements of the CL are consistent with a model instantiated with the estimated parameters and, if it is the case, can update a current best consensus set (CS) as a subset of the CL that fits within an inlier threshold criteria. This process can repeated until a probability measure, based on a ratio of inlier to the CL size and desired statistical significance, drops below an experimental threshold to create a homography matrix 524. In addition, the homography can be evaluated to determine accuracy 525. In the homography is not accurate enough, the homography can be refined, such as by re-estimating the homography from selection of a different random set of correspondence points 521 followed by an updated CS and using the DLT. In another embodiment, the RANSAC algorithm can be replaced with a Least Median of Squares estimate, eliminating a need for thresholds and/or a priori knowledge of errors, while imposing that at least 50% of correspondences are valid.

Information for both the video and radar sensors can represent the same, or at least an overlapping, planar surface that can be related by a homography. An estimated homography matrix can be computed by a Direct Linear Transform (DLT) of point correspondences $P_i$ between sensors, with a normalization step to provide stability and/or convergence of the homography solution. During configuration of the sensors, a list of point correspondences is accumulated, from which the homography can be computed. As described herein, two techniques can be implemented to achieve this.

A first technique involves, during setup, a Doppler generator being moved (e.g., by a technician) throughout the FOV of the video sensor. At several discrete non-collinear locations (e.g., four or more such locations) one or more Doppler generators can simultaneously or sequentially be maintained for a period of time (e.g., approximately 20 seconds) so that software can automatically determine a filtered average position of each Doppler signal within the radar sensor space. During essentially the same time period, a user can manually identify the position of each Doppler generator within the video FOV.

This technique can accomplish creation of a point correspondence between the radar and video sensors, and can be repeated until a particular number of point correspondences is achieved for the homography computation (e.g., four or more such point correspondences). When this is completed, quality of the homography can be visually verified by the observation of radar tracking markers from the radar sensor within the video stream. Accordingly, at this point, detection information from each sensor is available within the same FOV. Application software running on a laptop can provide the user with control over the data acquisition process, in addition to visual verification of radar locations overlaid on a video FOV.

This technique involves moving a hand held Doppler generator device as a way to create a stationary target within the radar and video FOVs. This can involve the technician being located at several different positions within the area of interest while the data is being collected and/or processed to compute the translation and/or rotation parameters used to align the two coordinate systems. Although this technique can provide acceptable alignment of coordinate planes, it may place the technician in harm's way by, for example, standing within the intersection approach while vehicles pass therethrough. Another consideration is that the Doppler generator device can add to the system cost, in addition to increased system setup complexity.

Figure 6A:
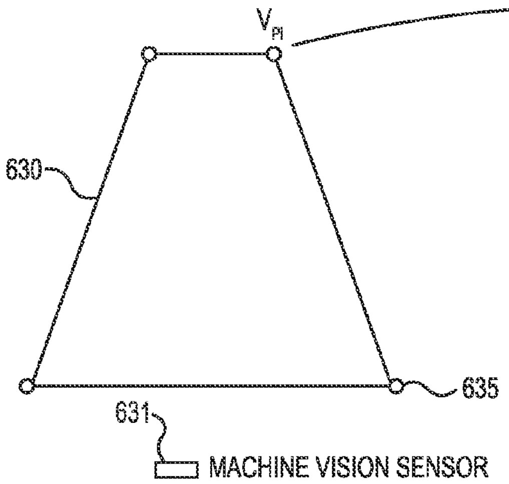
FIGS. 6A and 6B are schematic representations of disparate coordinate systems used in automated homography estimation according to the present disclosure.
Figure 6B:
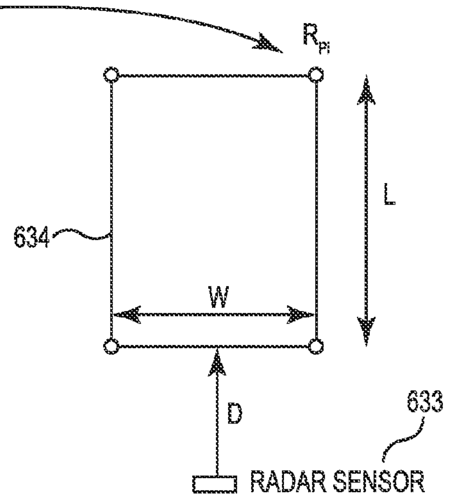

FIGS. 6A and 6B are schematic representations of disparate coordinate systems used in automated homography estimation according to the present disclosure. Usage of Doppler generator devices can be reduced or eliminated during sensor configuration and/or the time and/or labor involved in producing acceptable homography between the video and radar sensors can be reduced by allowing a single technician to configure an intersection without entering the intersection approach, therefore creating a more efficient and/or safe installation procedure. This can be implemented as a software application that accepts, for example, simultaneous video stream and radar detection data.

This can be accomplished by a second technique, as shown in FIG. 6A, where the technician defines a detection region 630 (e.g., a bounding box) in the FOV of the visible light machine vision sensor 631. As shown in FIG. 6B, the technician can provide for the radar sensor 633 initial estimates of a setback distance (D) of the radar sensor from a front of a detection zone 634 in real world distance (e.g., feet), a length (L) of the detection zone 634 in real world distance (e.g., feet), and/or a width (W) of the detection zone 634 in real world distance (e.g., feet). In some embodiments, D can be an estimated distance from the radar sensor 633 to the stop line 635 (e.g., a front of the bounding box) relative to the detection zone 634. The vertices of the bounding box (e.g., $V_{Pi}$) can be computed in pixel space, applied to the vertices (e.g., $R_{Pi}$) of the radar detection zone 634 and an initial transformation matrix can be computed.

This first approximation can place the overlay radar detection markers within the vicinity of the vehicles when the video stream is viewed. An interactive step can involve the technician manually adjusting the parameters of the detection zone while observing the homography results with real-time feedback on the video stream, within the software, through updated values of the point correspondences $P_i$ from ${}^{R}p_i$ in the radar to ${}^{v}p_i$ in the video. As such, the technician can refine normalization through a user interface, for example, with sliders that manipulate the D, movement of the bounding box from left to right, and/or increase or decrease of the W and/or L. In some embodiments, a rotation (R) adjustment control can be utilized, for example, when the radar system is not installed directly in front of the approach and/or a translation (T) control can be utilized, for example, when the radar system is translated perpendicular to the front edge of the detection zone. As such, in some embodiments, the user can make adjustments to the five parameters described above while observing the visual agreement of the information between the two sensors (e.g., video and radar) on the live video stream and/or on collected photographs.

Hence, visual agreement can be observed through the display of markers representing tracked objects, from the radar sensor, as a part of the video overlay within the video stream. In some embodiments, additional visualization of the sensor alignment can be achieved through projection of a regularly spaced grid from the radar space as an overlay within the video stream.

The present disclosure can leverage data fusion as a means to provide relatively high precision vehicle location estimates and/or robust detection decisions. Multi-sensor data fusion can be conceptualized as the combining of sensory data or data derived from sensory data from multiple sources such that the resulting information is more informative than would be possible when data from those sources was used individually. Each sensor can provide a representation of an environment under observation and estimates desired object properties, such as presence and/or speed, by calculating a probability of an object property occurring given sensor data.

The present disclosure includes multiple embodiments of data fusion. In one embodiment, a detection objective is improvement of vehicle detection location through fusion of features from multiple sensors. In some embodiments, for video sensor and radar sensor fusion, a video frame can be processed to extract image features such as gradients, key points, spatial intensity, and/or color information to arrive at image segments that describe current frame foreground objects. The image-based feature space can include position, velocity, and/or spatial extent in pixel space. The image features can then be transformed to a common, real-world coordinate space utilizing the homography transformation (e.g., as described above). Primary radar sensor feature data can include object position, velocity and/or length, in real world coordinates. The feature information from each modality can next be passed into a Kalman filter to arrive at statistically suitable vehicle position, speed, and/or spatial extent estimates. In this embodiment the feature spaces have been aligned to a common coordinate system, allowing for the use of a standard Kalman filter. Other embodiments can utilize an Extended Kalman Filter in cases where feature input space coordinate systems may not align. Although this embodiment is described with respect to image (e.g., video) and radar sensing modalities, other types of sensing modalities can be used as desired for particular applications.

In another embodiment, the detection objective is to produce a relatively high accuracy of vehicle presence detection when a vehicle enters a defined detection space. In this instance, individual sensor system detection information can be utilized in addition to probabilistic information about accuracy and/or quality of the sensor information given the sensing environment. The sensing environment can include traffic conditions, environmental conditions, and/or intersection geometry relative to sensor installation. Furthermore, probabilities of correct sensor environmental conditions can also be utilized in the decision process.

A first step in the process can be to represent the environment under observation in a numerical form capable of producing probability estimates of given object properties. An object property Θ is defined as presence, position, direction, and/or velocity and each sensor can provide enough information to calculate the probability of one or more object properties. Each sensor generally represents the environment under observation in a different way and the sensors provide numerical estimates of the observation. For example, a video represents an environment as a grid of numbers representing light intensity. A range finder (e.g., lidar) represents an environment as distance measurement. A radar sensor represents an environment as position in real world coordinates while an IR sensor represents an environment as a numerical heat map. In case of video, pixel level information can be represented as a vector of intensity levels, while the feature space information can include detection object positions, velocities, and/or spatial extent. Therefore, sensor N can represent the environment in a numerical form as $X^N=\{x_1, x_2, \ldots, x_j\}$, where $x_1$ is one sensor measurement and all sensor measurement values at any given time are represented by $X^N$. Next a probability of an object property given the sensor data can be calculated. An object property can be defined as Θ. Therefore, a probability of sensor output being X given object property Θ can be calculated and/or of object property being Θ given sensor output is X can be calculated, namely by:

P(X|Θ)—probability of sensor output being X given object property Θ (a priori probability), and P(Θ|X)—probability of object property being Θ given sensor output is X (a posteriori probability).

In the case of the present disclosure, a priori probabilities of correct environmental detection in addition to environmental conditional probabilities can also be utilized to further define expected performance of the system in the given environment. This information can be generated through individual sensor system observation and/or analysis during defined environmental conditions. One example of this process involves collecting sensor detection data during a known condition, and for which a ground truth location of the vehicle objects can be determined. Comparison of sensor detection to the ground truth location provides a statistical measure of detection performance during the given environmental and/or traffic condition. This process can be repeated to cover the expected traffic and/or environmental conditions.

Next, two or more sensor probabilities for each of the object properties can be fused together to provide single estimate of an object property. In one embodiment, vehicle presence can be estimated by fusing the probability of a vehicle presence in each sensing modality, such as the probability of a vehicle presence in a video sensor and the probability of a vehicle presence in radar sensor. Fusion can involve fusion of k sensors, where 1<k≤N, N is the total number of sensors in the system, Θ is the object property desired to estimate, for example, presence. The probability of object property Θ can be estimated from k sensors' data X by calculating P(Θ|X) based on N probabilities obtained from sensors' reading along with application of Bayes' Laws and derived equations:

$$P(\Theta \mid X) = \frac{P(X \mid \Theta) \cdot p(\Theta)}{p(X)}$$

$$P(X \mid \Theta) = \prod_{i}^{k} p(X^i \mid \Theta)$$

A validation check can be performed to determine if two or more sensors should continue to be fused together by calculating a Mahalanobis distance metric of the sensors' data. The Mahalanobis distance will increase if sensors no longer provide reliable object property estimate and therefore should not be fused. Otherwise, data fusion can continue to provide an estimate of the object property. To check if two or more sensor datasets should be fused, the Mahalanobis distance M can be calculated:

$$M=0.5*(X^1-X^N)S^{-1}(X^1-X^N)$$

where $X^1$ and $X^N$ are sensor measurements, S is the variance-covariance matrix, and $M<M_0$ is a suitable threshold value. A value of M greater than $M_0$ can indicate that sensors should no longer be fused together and another combination of sensors should be selected for data fusion. By performing this check for each combination of sensors the system can automatically monitor sensor responsiveness to the environment. For example, a video sensor may no longer be used if the M distance between its data and radar data has value higher than $M_0$ and if the M distance between its data and range finder data also has M higher than $M_0$ and the M value between radar and range finder data is low, indicating the video sensor is no longer suitably capable to estimate object property using this data fusion technique.

The present disclosure can utilize a procedure for automated determination of a road intersection geometry for a traffic monitoring system using a single video camera. This technique can be applied to locations other than intersections in addition. The video frames can be analyzed to extract lane feature information from the observed road intersection and model them as lines in an image. A stop line location can be determined by analyzing a center of mass of detected foreground objects that are clustered based on magnitude of motion offsets. Directionality of each lane can be constructed based on clustering and/or ranking of detected foreground blobs and their directional offset angles.

In an initial step of automated determination of the road intersection geometry, a current video frame can be captured followed by recognition of straight lines using a Probabilistic Hough Transform, for example. The Probabilistic Hough Transform H(y) can be defined as a log of a probability density function of the output parameters, given the available input features from an image. A resultant candidate line list can be filtered based on length on general directionality. Lines that fit general length and directionality criteria based on the Probabilistic Hough Transform can be selected for the candidate line list. A vanishing point V can then be created from the filtered candidate line list.

Figure 7:
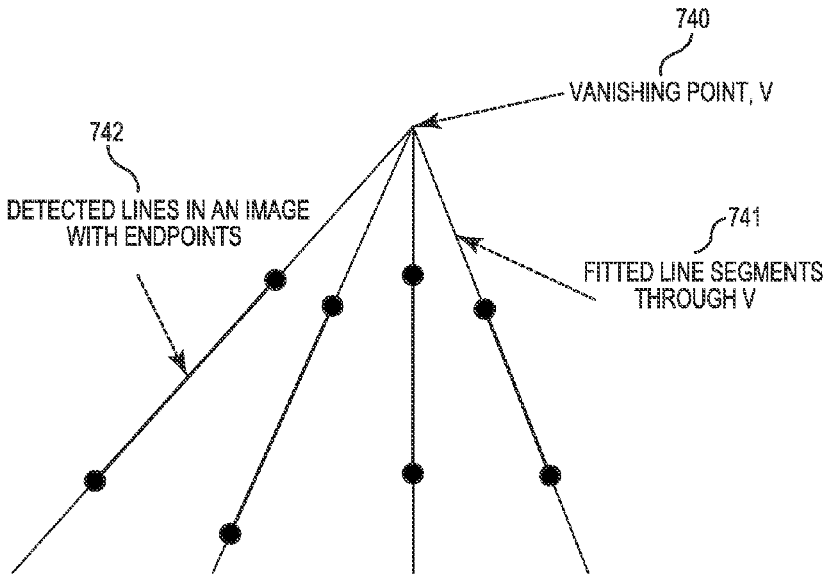
FIG. 7 is a schematic illustration of example data for a frame showing information used to estimate a vanishing point according to the present disclosure.

FIG. 7 is a schematic illustration of example data for a frame showing information used to estimate a vanishing point according to the present disclosure. The image data for the frame shows the vanishing point V 740 relative to extracted line segments from the current frame. Estimating the vanishing point V 740 can involve fitting a line through a nominal vanishing point V to each detected line in the image 741. Identifying features such as lines in an image can be considered a parameter estimation problem. A set of parameters represents a model for a line and the task is to determine if the model correctly describes a line. An effective approach to this type of problem is to use Maximum Likelihoods. Using a maximum likelihood estimate, the system can find the vanishing point V 740, which is a point that minimizes a sum of squared orthogonal distances between the fitted lines and detected lines' endpoints 742. The minimization can be computed using various techniques (e.g., utilizing a Levenberg-Marquardt algorithm, among others). This process allows estimation of traffic lane features, based on the fitted lines starting 741 at the vanishing point V 740.

A next step can address detection of traffic within spatial regions. First a background model can be created using a mixture of Gaussians. For each new video frame, the system can detect pixels that are not part of a background model and label those detected pixels as foreground. Connected components can then be used to cluster pixels into foreground blobs and to compute a mass centerpoint of each blob. Keypoints can be detected, such as using Harris corners in the image that belong to each blob, and blob keypoints can be stored. In the next frame, foreground blobs can be detected and keypoints from the previous frame can be matched to the current (e.g., next) frame, such as using an optical flow Lukas-Kanade method. For each blob, an average direction and magnitude of optical flow can be computed and associated with the corresponding blob center mass point. Thus, a given blob can be represented by single (x,y) coordinate and can have one direction vector (dx and dy) and/or a magnitude value m and an angle a. Blob centroids can be assigned lanes that were previously identified.

Figure 8:
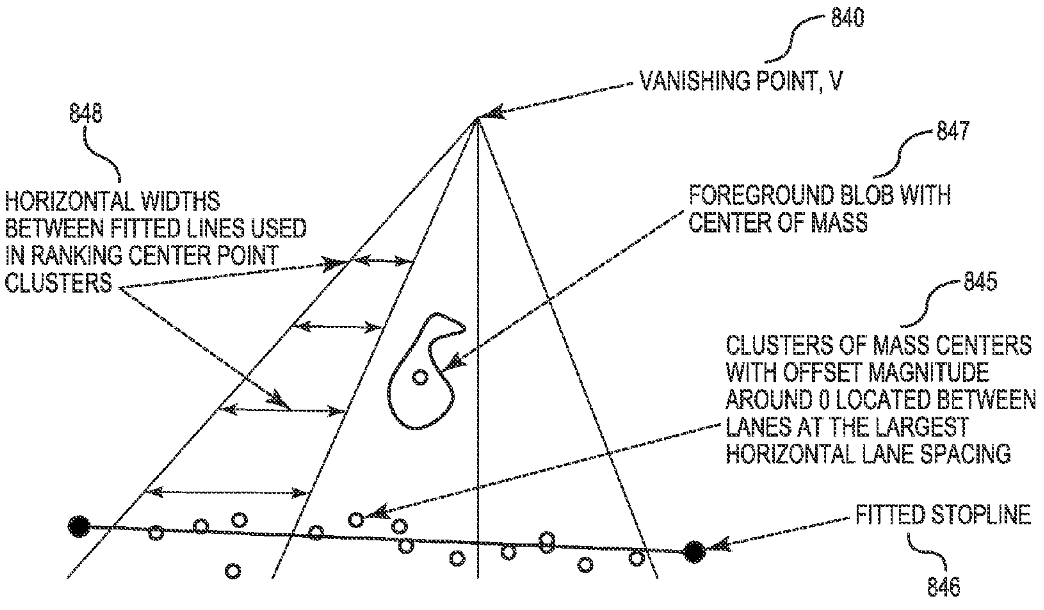
FIG. 8 is a schematic illustration of example data used to estimate a location of a stop line according to the present disclosure.

A next step can address detection of a stop line location, which can be accomplished by analyzing clustering of image locations with keypoint offset magnitudes around zero. FIG. 8 is a schematic illustration of example data used to estimate a location of a stop line according to the present disclosure. For the blob centerpoints with keypoint offset magnitudes around zero, based on proximity to a largest horizontal distance between lanes 845, a line can be fitted 846 (e.g., using a RANSAC method), which can establish a region within the image that is most likely the stop line. In other words, most or all blob centroids close to the actual stop line of an intersection tend to have more motion vectors close to zero than other centroids along a given lane, because more vehicles tend to be stationary close to the stop line than any other location in the lane. However, in heavy traffic, many centroids with motion vector near zero 847 may be present but the system (e.g., assuming a sensor FOV looking down-lane from an intersection) can pick centroids located where the lines parallel to the road lanes that have the largest horizontal width 848 (e.g., based upon a ranking of the horizontal widths). Therefore, where there is a long queue of vehicles at an intersection the system can pick an area of centroids with zero or near-zero motion vectors that is closer to the actual stop line.

Figure 9:
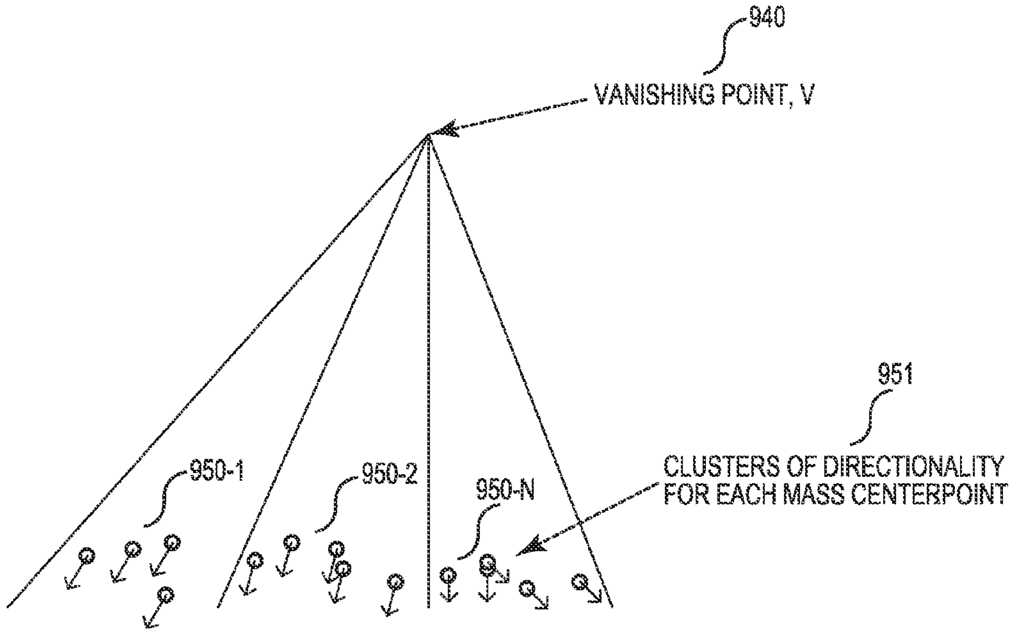
FIG. 9 is a schematic illustration of example data used to assign lane directionality according to the present disclosure.

A further, or last, step in the process can assign lane directionality. FIG. 9 is a schematic illustration of example data used to assign lane directionality according to the present disclosure. For each lane 950-1, 950-2, . . . , 950-N, the system can build a directionality histogram from the centerpoints found using the process described above. Data in the histogram can be ranked based on centerpoint count in clusters of directionality based upon consideration of each centerpoint 951 and one or more directionality identifiers can be assigned to each lane. For instance, a given lane could be assigned a one way directionality identifier in a given direction.

The present disclosure can utilize a procedure for automated determination of typical traffic behaviors at intersections or other roadway-associated locations. Traditionally, a system user may be required to identify expected traffic behaviors on a lane-by-lane basis (e.g., through manual analysis of movements and turn movements).

The present disclosure can reduce or eliminate a need for user intervention by allowing for automated determination of typical vehicle trajectories during initial system operation. Furthermore, this embodiment can continue to evolve the underlying traffic models to allow for traffic model adaptation during normal system operation, that is, subsequent to initial system operation. This procedure can work with a wide range of traffic sensors capable of producing vehicle features that can be refined into statistical track state estimates of position and/or velocity (e.g., using video, radar, lidar, etc., sensors).

Figure 10:
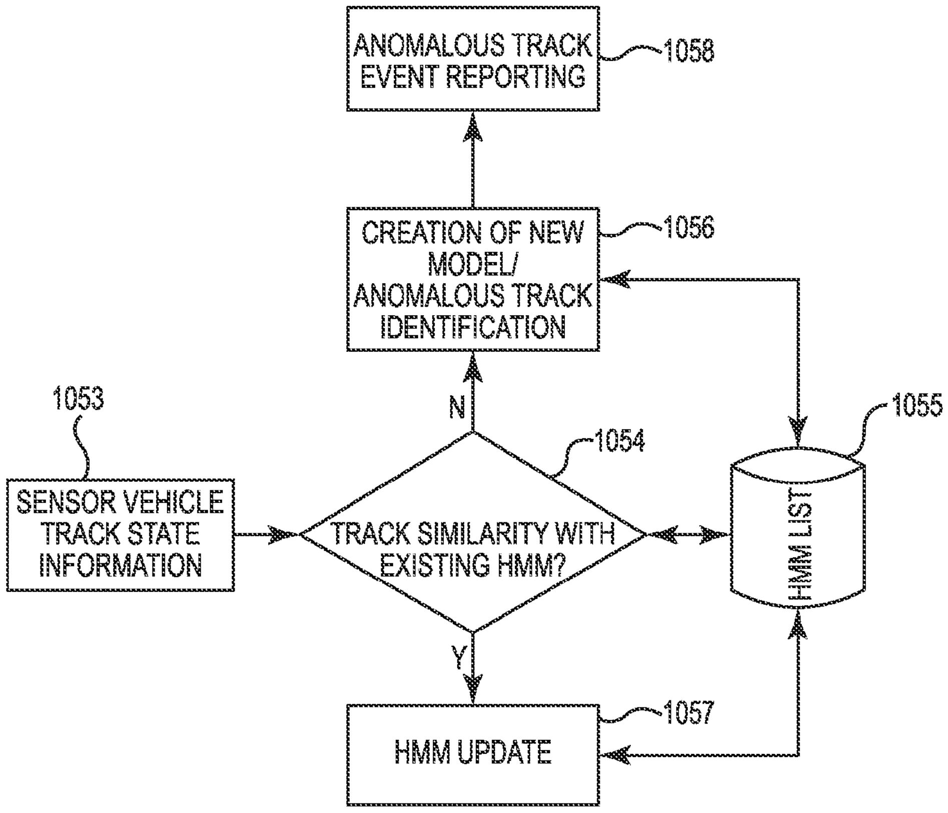
FIG. 10 is a flow chart of an embodiment of automated traffic behavior identification according to the present disclosure.

FIG. 10 is a flow chart of an embodiment of automated traffic behavior identification according to the present disclosure. Real-time tracking data can be used to create and/or train predefined statistical models (e.g., Hidden Markov Models (HMMs), among others). For example, HMMs can compare incoming track position and/or velocity information 1053 to determine similarity 1054 with existing HMM models (e.g., saved in a HMM list 1055) to cluster similar tracks. If a new track does not match an existing model, it can then be considered an anomalous track and grouped into a new HMM 1056, thus establishing a new motion pattern that can be added to the HMM list 1055. The overall model can develop as HMMs are updated and/or modified 1057 (e.g., online), adjusting to new tracking data as it becomes available, evolving such that each HMM corresponds to a different route, or lane, of traffic (e.g., during system operation). Within each lane, states and parameters of the associated HMM can describe identifying turning and/or stopping characteristics for detection performance and/or intersection control. In an alternate embodiment, identification of anomalous tracks that do not fit existing models can be identified as a non-typical traffic event, and, in some embodiments, can be reported 1058, for example, to an associated traffic controller as higher level situational awareness information.

A first step in the process can be to acquire an output of each sensor at an intersection, or other location, which can provide points of interest that reflect positions of vehicles in the scene (e.g., the sensors field(s) at the intersection or other location). In a video sensor embodiment, this can be accomplished through image segmentation, motion estimation, and/or object tracking techniques. The points of interest from each sensor can be represented as (x, y) pairs in a Cartesian coordinate system. Velocities ($v_x$, $v_y$) for a given object can be calculated from the current and previous state of the object. In another, radar sensor embodiment, a Doppler signature of the sensor can be processed to arrive at individual vehicle track state information. A given observation variable can be represented as a multidimensional vector of size M, $$\vec{o_t} = [x_1, \ldots , x_M],$$

and can be measured from position and/or velocity estimates from each object. A sequence of these observations (e.g., object tracks) can be used to instantiate an HMM.

A second step in the process can address creation and/or updating of the HMM model. When a new observation track $\vec{o_1}$ is received from the sensor it can be tested against some or all available HMMs using a log-likelihood measure of spatial and/or velocity similarity to the model, $P(\lambda|\vec{o_1})$, where $\lambda$ represents the current HMM. For instance, if the log-likelihood value is greater than a track dependent threshold, the observation can be assigned to the HMM, which can then be recalculated using the available tracks. Observations that fail to qualify as a part of any HMM or no longer provide a good fit with the current HMM (e.g., are above an experimental threshold) can be assigned to a new or other existing HMM that provides a better fit.

Another, or last, step in the process can involve observation analysis and/or classification of traffic behavior. Because the object tracks can include both position and/or velocity estimates, the resulting trained HMMs are position-velocity based and can permit classification of lane types (e.g., through left-turn, right-turn, etc.) based on normal velocity orientation states within the HMM. Additionally, incoming observations from traffic can be assigned to the best matching HMM and a route of traffic through an intersection predicted, for example. Slowing and stopping positions within each HMM state can be identified to represent an intersection via the observation probability distributions within each model, for instance.

Figure 11A:
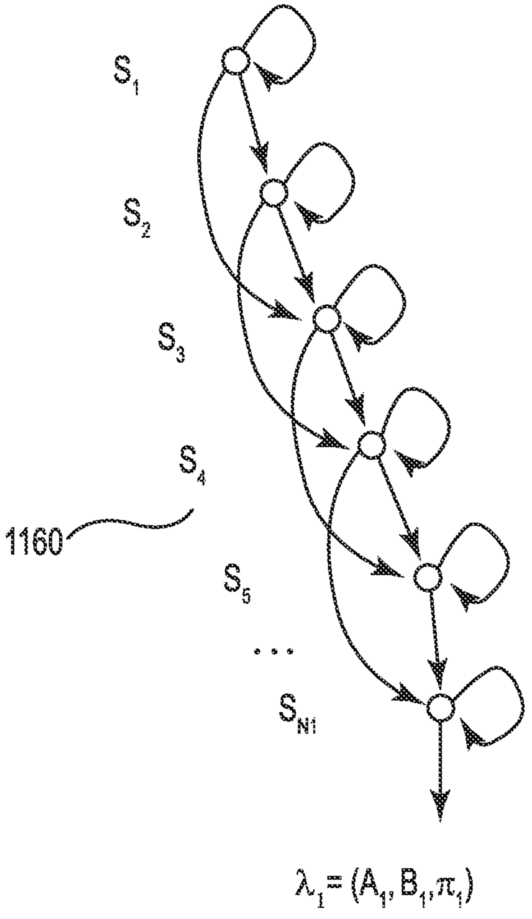
FIGS. 11A and 11B are graphical representations of Hidden Markov Model (HMM) state transitions according to the present disclosure as a detected vehicle traverses a linear movement and a left turn movement, respectively.
Figure 11B:
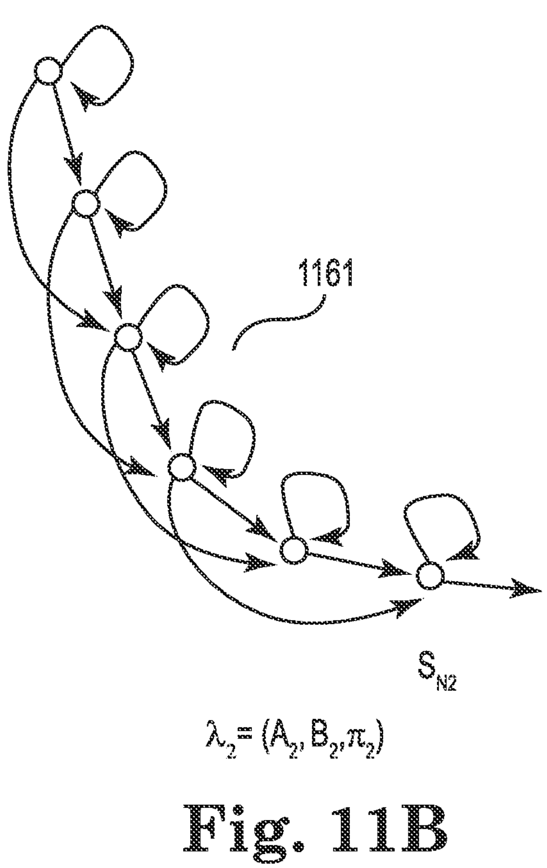

FIGS. 11A and 11B are graphical representations of HMM state transitions according to the present disclosure as a detected vehicle traverses a linear movement and a left turn movement, respectively. As such, FIG. 11A is a graphical representation of HMM state transitions 1160 as a detected vehicle traverses a linear movement and FIG. 11B is a graphical representation of HMM state transitions 1161 as a detected vehicle traverses a left turn movement. As shown in FIGS. 11A and 11B, a specification of multiple HMMs representing an intersection can be generated by adjustment of model parameters to better describe incoming observations from sensors, where $A=\{a_{ij}\}$ represents a state transition probability distribution, where:

$$a_{ij} = P[q_{t+1} = S_j \mid q_t = S_i],\ i \geq 1,\ j \leq N,\ B = \{b_j(k)\}$$

represents the observation symbol probability, and $$b_j(k) = P[x_k \text{ at } t \mid q_t = S_j],\ 1 \geq j \leq N,\ 1 \geq k \leq M, \text{ and } \pi = \{\pi_i\}$$

represents the initial state distribution, such that $$\pi_i = P[q_1 = S_i],\ 1 \geq i \leq N.$$

Figure 12:
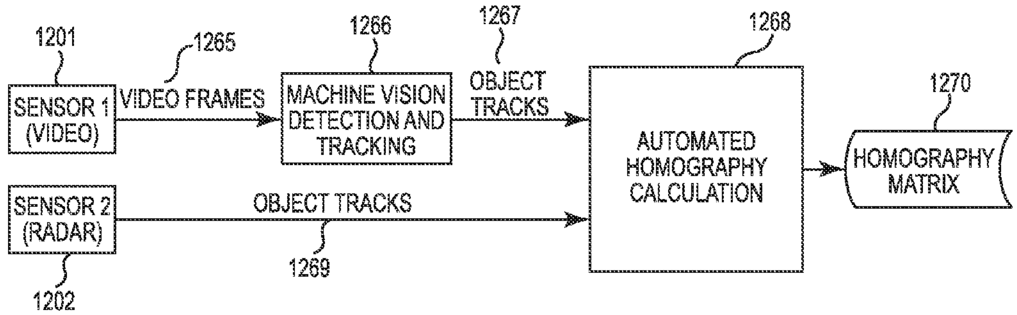
FIG. 12 is a schematic block diagram of an embodiment of creation of a homography matrix according to the present disclosure.

FIG. 12 is a schematic block diagram of an embodiment of creation of a homography matrix according to the present disclosure. During system initialization or otherwise, in some embodiments, sensor 1 shown at 1201 (e.g., a visible light machine vision sensor, such a video recorder) can input a number of video frames 1265 to a machine vision detection and/or tracking functionality 1266, as described herein, which can output object tracks 1267 to an automated homography calculation functionality 1268 (e.g., that operates by execution of machine-executable instructions stored on a non-transitory machine-readable medium, as described herein). In addition, sensor 2 shown at 1202 (e.g., a radar sensor) can input object tracks 1269 to the automated homography calculation functionality 1268. As described herein, the combination of the object tracks 1267, 1269 resulting from observations by sensors 1 and 2 can be processed by the automated homography calculation functionality 1268 to output a homography matrix 1270, as described herein.

Figure 13:
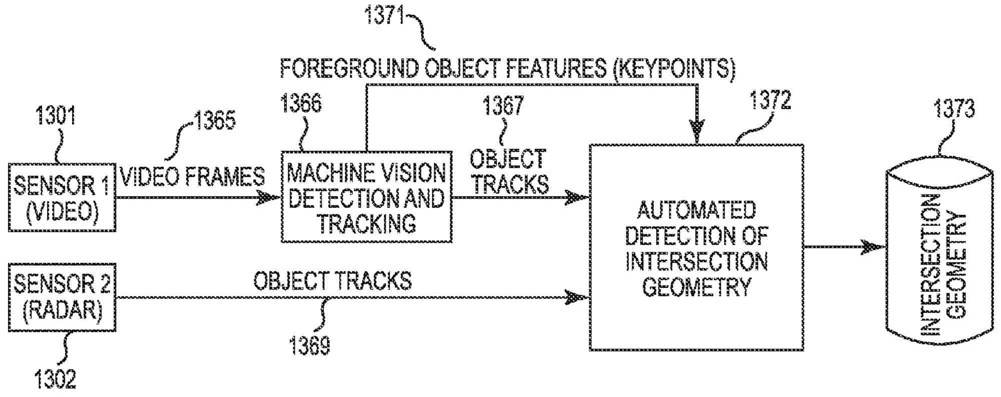
FIG. 13 is a schematic block diagram of an embodiment of automated detection of intersection geometry according to the present disclosure.

FIG. 13 is a schematic block diagram of an embodiment of automated detection of intersection geometry according to the present disclosure. During system initialization or otherwise, in some embodiments, sensor 1 shown at 1301 (e.g., a visible light machine vision sensor, such a video recorder) can input a number of video frames 1365 to a machine vision detection and/or tracking functionality 1366, as described herein, which can output detection and/or localization of foreground object features 1371 (e.g., keypoints) to an automated detection of intersection geometry functionality 1372 (e.g., that operates by execution of machine-executable instructions stored on a non-transitory machine-readable medium, as described herein). The machine vision detection and/or tracking functionality 1366 also can output object tracks 1367 to automated detection of intersection geometry functionality 1372. In addition, sensor 2 shown at 1302 (e.g., a radar sensor) can input object tracks 1369 to the automated detection of intersection geometry functionality 1372. As described herein, the combination of the keypoints and object tracks resulting from observations by sensors 1 and 2 can be processed by the automated detection of intersection geometry functionality 1372 to output a representation of intersection geometry 1373, as described herein.

Figure 14:
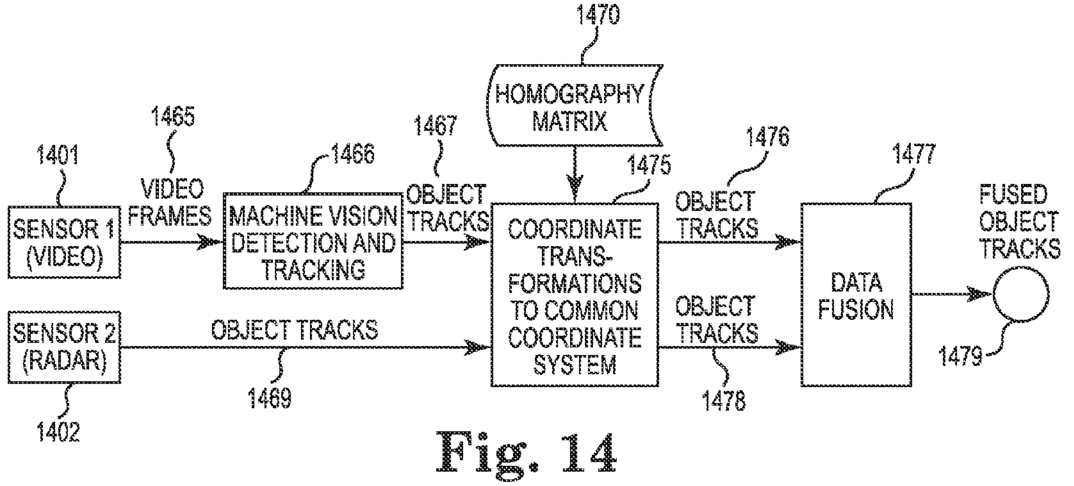
FIG. 14 is a schematic block diagram of an embodiment of detection, tracking, and fusion according to the present disclosure.

FIG. 14 is a schematic block diagram of an embodiment of detection, tracking, and fusion according to the present disclosure. During system operation, in some embodiments, sensor 1 shown at 1401 (e.g., a visible light machine vision sensor, such a video recorder) can input a number of video frames 1465 to a machine vision detection and/or tracking functionality 1466, as described herein, which can output object tracks 1467 to a functionality that coordinates transformation of disparate coordinate systems to a common coordinate system 1477 (e.g., that operates by execution of machine-executable instructions stored on a non-transitory machine-readable medium, as described herein). In addition, sensor 2 shown at 1402 (e.g., a radar sensor) can input object tracks 1469 to the functionality that coordinates transformation of disparate coordinate systems to the common coordinate system 1475.

The functionality that coordinates transformation of disparate coordinate systems to the common coordinate system 1475 can function by input of a homography matrix 1470 (e.g., as described with regard to FIG. 12). As described herein, the combination of the object tracks resulting from observations by sensors 1 and 2 can be processed by the functionality that coordinates transformation of disparate coordinate systems to output object tracks 1476, 1478 that are represented in the common coordinate system, as described herein. The object tracks from sensors 1 and 2 that are transformed to the common coordinate system can each be input to a data fusion functionality 1477 (e.g., that operates by execution of machine-executable instructions stored on a non-transitory machine-readable medium, as described herein) that outputs a representation of fused object tracks 1479, as described herein.

Figure 15:
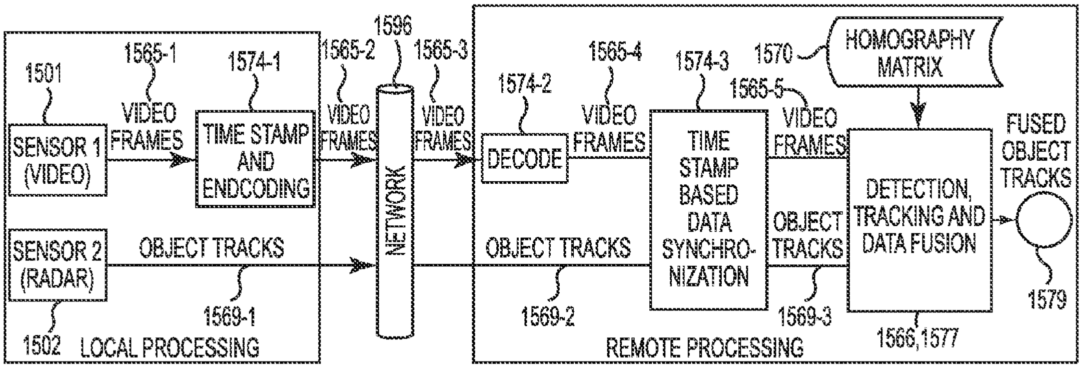
FIG. 15 is a schematic block diagram of an embodiment of remote processing according to the present disclosure.

FIG. 15 is a schematic block diagram of an embodiment of remote processing according to the present disclosure. In various embodiments, as illustrated in the example shown in FIG. 15, the detection, tracking, and/or data fusion processing (e.g., as described with regard to FIGS. 12-14) can be performed remotely (e.g., on a remote and/or cloud based processing platform) from input of local sensing and/or initial processing (e.g., on a local multi-sensor platform) data, for example, related to vehicular activity in the vicinity of a roadway and/or intersection. For example, sensor 1 shown at 1501 can input data (e.g., video frames 1565-1) to a time stamp and encoding functionality 1574-1 on the local platform that can output encoded video frames 1565-2 (e.g., as a digital data stream) that each has a time stamp associated therewith, as described herein.

Such data can subsequently be communicated (e.g., uploaded) through a network connection 1596 (e.g., by hardwire and/or wirelessly) for remote processing (e.g., in the cloud). Although not shown for ease of viewing, for example, sensor 2 shown at 1502 also can input data (e.g., object tracks 1569-1) to the time stamp and encoding functionality 1574-1 that can output encoded object tracks that each has a time stamp associated therewith to the network connection 1596 for remote processing. As described herein, there can be more than two sensors on the local platform that input data to the time stamp and encoding functionality 1574-1 that upload encoded data streams for remote processing. As such, sensor data acquisition and/or encoding can be performed on the local platform, along with attachment (e.g., as a time stamp) of acquisition time information. Resultant digital information (e.g., video frames 1565-2 and object tracks 1569-1) can be transmitted to and/or from the network connection 1596 via a number of digital streams (e.g., video frames 1565-2, 1565-3), thereby leveraging, for example, Ethernet transport mechanisms.

The network connection 1596 can operate as an input for remote processing (e.g., by cloud based processing functionalities in the remote processing platform). For example, upon input to the remote processing platform, the data can, in some embodiments, be input to a decode functionality 1574-2 that decodes a number of digital data streams (e.g., video frame 1565-3 decoded to video frame 1565-4). Output (e.g., video frame 1565-4) from the decode functionality 1574-2 can be input to a time stamp based data synchronization functionality 1574-3 that matches, as described herein, putative points of interest at least partially by having identical or nearly identical time stamps to enable processing of simultaneously or nearly simultaneously acquired data as matched points of interest.

Output (e.g., matched video frames 1565-5 and object tracks 1569-3) of the time stamp based data synchronization functionality 1574-3 can be input to a detection, tracking, and/or data fusion functionality 1566, 1577. The detection, tracking, and/or data fusion functionality 1566, 1577 can perform a number of functions described with regard to corresponding functionalities 1266, 1366, and 1466 shown in FIGS. 12-14 and 1477 shown in FIG. 14. In some embodiments, the detection, tracking, and/or data fusion functionality 1566, 1577 can operate in conjunction with a homography matrix 1570, as described with regard to 1270 shown in FIG. 12 and 1470 shown in FIG. 14, for remote processing (e.g., in the cloud) to output fused object tracks 1579, as described herein.

Figure 16:
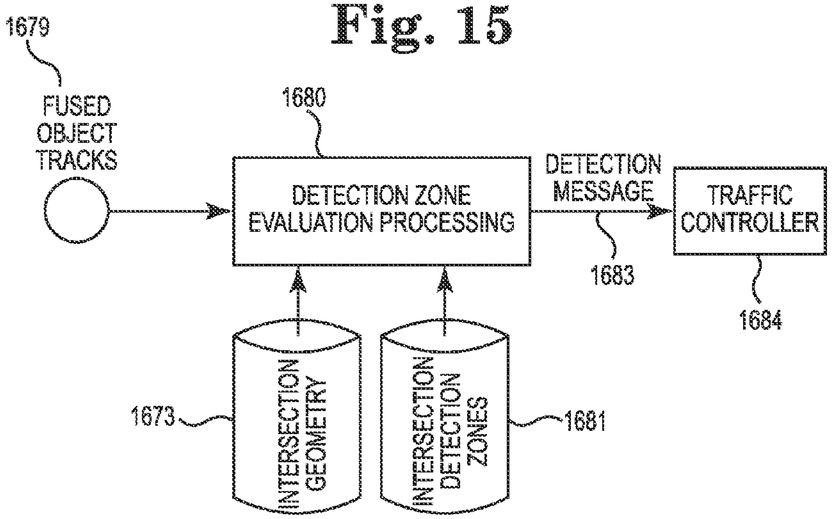
FIG. 16 is a schematic block diagram of an embodiment of data flow for traffic control according to the present disclosure.

FIG. 16 is a schematic block diagram of an embodiment of data flow for traffic control according to the present disclosure. During system operation, in some embodiments, fused object tracks 1679 (e.g., as described with regard to FIG. 14) can be input to a functionality for detection zone evaluation processing 1680 (e.g., that operates by execution of machine-executable instructions stored on a non-transitory machine-readable medium, as described herein) to monitor data flow (e.g., vehicles, pedestrians, debris, etc.) for traffic control.

The functionality for detection zone evaluation processing 1680 can receive input of intersection geometry 1673 (e.g., as described with regard to FIG. 13). In some embodiments, the functionality for detection zone evaluation processing 1680 also can receive input of intersection detection zones 1681. The intersection detection zones 1681 can represent detection zones as defined by the user with the adjustable D, W, L, R, and/or T parameters, as described herein, and/or the zone near a stop line location, within a dilemma zone, and/or within an advanced zone, as described herein. The functionality for detection zone evaluation processing 1680 can process and/or evaluate the input of the fused object tracks 1679 based upon the intersection geometry 1673 and/or the intersection detection zones 1681 to detect characteristics of the data flow associated with the intersection or elsewhere. In various embodiments, as described herein, the functionality for detection zone evaluation processing 1680 can output a number of detection messages 1683 to a traffic controller functionality 1684 (e.g., for detection based signal actuation, notification, more detailed evaluation, statistical analysis, storage, etc., of the number of detection messages pertaining to the data flow by execution of machine-executable instructions stored on a non-transitory machine-readable medium, as described herein). In some embodiments, fused object tracks 1679 can be transmitted directly to the traffic controller functionality 1684 and/or a data collection service. Accordingly, object track data can include a comprehensive list of objects sensed within the FOV of one or more sensors.

Figure 17:
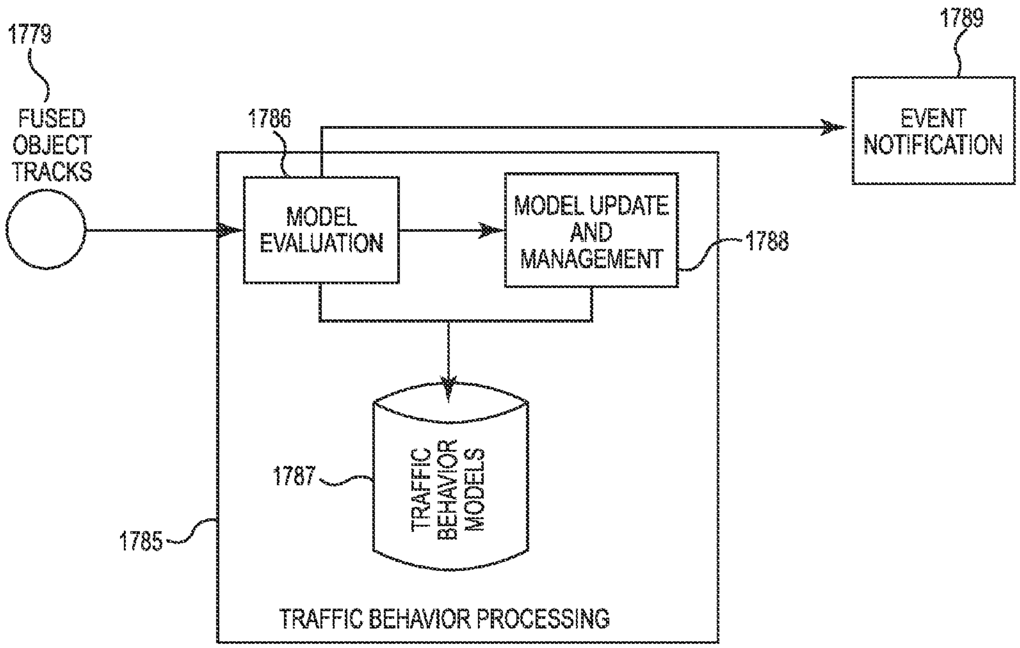
FIG. 17 is a schematic block diagram of an embodiment of data flow for traffic behavior modelling according to the present disclosure.

FIG. 17 is a schematic block diagram of an embodiment of data flow for traffic behavior modelling according to the present disclosure. During system operation, in some embodiments, fused object tracks 1779 (e.g., as described with regard to FIG. 14) can be input to a functionality for traffic behavior processing 1785 (e.g., that operates by execution of machine-executable instructions stored on a non-transitory machine-readable medium, as described herein) for traffic behavior modelling. The fused object tracks 1779 can first be input to a model evaluation functionality 1786 within the functionality for traffic behavior processing 1785. The model evaluation functionality 1786 can have access to a plurality of traffic behavior models 1787 (e.g., stored in memory) to which the each of the fused object track 1779*s* can be compared to determine an appropriate behavioral match.

For example, the fused object tracks 1779 can be compared to (e.g., evaluated with) predefined statistical models (e.g., HMMs, among others). If a particular fused object track does not match an existing model, the fused object track can then be considered an anomalous track and grouped into a new HMM, thus establishing a new motion pattern, by a model update and management functionality 1788. In some embodiments, the model update and management functionality 1788 can update a current best consensus set (CS) as a subset of the correspondence list (CL) that fits within an inlier threshold criteria. This process can repeated, for example, until a probability measure, based on a ratio of inlier to the CL size and desired statistical significance, drops below an experimental threshold. In some embodiments, the homography matrix (e.g., as described with regard to FIG. 12) can be refined, for example, by re-estimating the homography from the CS using the DLT. The model update and management functionality 1788 can receive input from the model evaluation functionality 1786 to indicate that an appropriate behavioral match with existing models was not found to as a trigger to create a new model. After the creation, the new model can be input by the model update and management functionality 1789 to the plurality of traffic behavior models 1787 (e.g., stored in memory) to which the each of the incoming fused object tracks 1779 can be subsequently compared (e.g., evaluated) to determine an appropriate behavioral match.

In various embodiments, if input of a particular fused object track and/or a defined subset of fused object tracks matches a defined traffic behavioral model (e.g., illegal U-turn movements within an intersection, among many others) and/or does not match at least one of the defined traffic behavioral models, the functionality for traffic behavior processing 1785 can output an event notification 1789. In various embodiments, the event notification 1789 can be communicated (e.g., by hardwire, wirelessly, and/or through the cloud) to public safety agencies.

Some multi-sensor detection system embodiments have fusion of video and radar detection for the purpose of, for example, improving detection and/or tracking of vehicles in various situations (e.g., environmental conditions). The present disclosure also describes how Automatic License Plate Recognition (ALPR) and wide angle FOV sensors (e.g., omnidirectional or 180 degree FOV cameras and/or videos) can be integrated into a multi-sensor platform to increase the information available from the detection system.

Tightened government spending on transportation related infrastructure has resulted in a demand for increased value in procured products. There has been a simultaneous increase in demand for richer information to be delivered from deployed infrastructure, to include wide area surveillance, automated traffic violation enforcement, and/or generation of efficiency metrics that can be used to legitimize the cost incurred to the taxpayer. Legacy traffic management sensors, previously deployed at the intersection, can acquire a portion of the required information. For instance, inductive loop sensors can provide various traffic engineering metrics, such as volume, occupancy, and/or speed. Above ground solutions extend on inductive loop capabilities, offering a surveillance capability in addition to extended range vehicle detection without disrupting traffic during the installation process. Full screen object tracking solutions provide yet another step function in capability, revealing accurate queue measurement and/or vehicle trajectory characteristics such as turn movements and/or trajectory anomalies that can be classified as incidents on the roadway.

Wide angle FOV imagery can be exploited to monitor regions of interest within the intersection, an area that is often not covered by individual video or radar based above ground detection solutions. Of interest in the wide angle sensor embodiments described herein is the detection of pedestrians in or near the crosswalk, in addition to detection, tracking, and/or trajectory assessment of vehicles as they move through the intersection. The detection of pedestrians within the crosswalk is of significant interest to progressive traffic management plans, where the traffic controller can extend the walk time as a function of pedestrian presence as a means to increase intersection safety. The detection, tracking and/or trajectory analysis of vehicles within the intersection provides data relevant to monitoring the efficiency and/or safety of the intersection. One example is computing mainline vehicle gap statistics when a turn movement occurs between two consecutive vehicles. Another example is monitoring illegal U-turn movements within an intersection. Yet another example is incident detection within the intersection followed by delivery of incident event information to public safety agencies.

Introduction of ALPR to the multi-sensor, data fusion based traffic detection system creates a paradigm shift from traffic control centric information to complete roadway surveillance information. This single system solution can provide information important to traffic control and/or monitoring, in addition to providing information used to enforce red light violations, computation of accurate travel time expectations and/or law enforcement criminal apprehension through localization of personal assets through capture of license plates as vehicles move through monitored roadways.

Recent interest and advancement of intelligent infrastructure to include vehicle to infrastructure (V2I) and/or vehicle to vehicle (V2V) communication creates new demand for high accuracy vehicle location and/or kinematics information to support dynamic driver warning systems. Collision warning and/or avoidance systems can make use of vehicle, debris, and/or pedestrian detection information to provide timely feedback to the driver.

ALPR solutions have been designed as standalone systems that require license plate detection algorithms to localize regions within the sensor FOV where ALPR character recognition should take place. Specific object features can be exploited, such a polygonal line segments, to infer license plate candidates. This process can be aided through the use of IR light sensors and/or illumination to isolate retroreflective plates. However, several issues arise with a system architected in this manner. First, the system has to include dedicated continuous processing for the sole purpose of isolating plate candidates. Secondly, plate detection can significantly suffer in regions where the plates may not be retroreflective and/or measures have been taken by the vehicle owner to reduce the reflectivity of the license plate. In addition, there may be instances where other vehicle features may be identified as a plate candidate.

Figure 18:
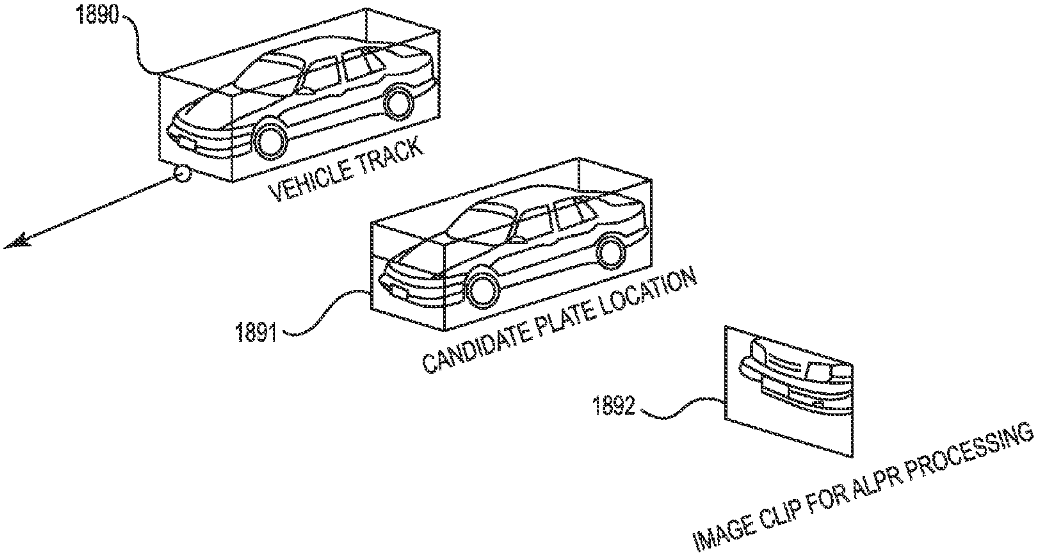
FIG. 18 is a schematic illustration of an example of leveraging vehicle track information for license plate localization for an automatic license plate reader (ALPR) according to the present disclosure.

FIG. 18 is a schematic illustration of an example of leveraging vehicle track information for license plate localization for an automatic license plate reader (ALPR) according to the present disclosure. As each vehicle approaches the ALPR, a vehicle track 1890 can be created through detection and/or tracking functionalities, as described herein. The proposed embodiment leverages the vehicle track 1890 state as a means to provide a more robust license plate region of interest (e.g., single or multiple), or a candidate plate location 1891, where the ALPR system can isolate and/or interrogate the plate number information. ALPR specific processing requirements are reduced, as the primary responsibility is to perform character recognition within the candidate plate location 1891. False plate candidates are reduced through knowledge of vehicle position and relationship with the ground plane. Track state estimates that include track width and/or height combined with three dimensional scene calibration can yield a reliable candidate plate location 1891 where the license plate is likely to be found.

A priori scene calibration can then be utilized to estimate the number of pixels that reside on the vehicle license plate as a function of distance from the sensor. Regional plate size estimates and/or camera characteristics can be referenced from system memory as part of this processing step. ALPR character recognition minimum pixels on license plate can then be used as a cue threshold for triggering the character recognition algorithms. The ALPR cueing service triggers the ALPR character recognition service once the threshold has been met. An advantage to this is that the system can make fewer partial plate reads, which can be common if the plate is detected before adequate pixels on target exist. Upon successful plate read, the information (e.g., the image clip 1892) can be transmitted for ALPR processing. In various embodiments, the image clip 1892 can be transmitted to back office software services for ALPR processing, archival, and/or cross reference against public safety databases.

Figure 19:
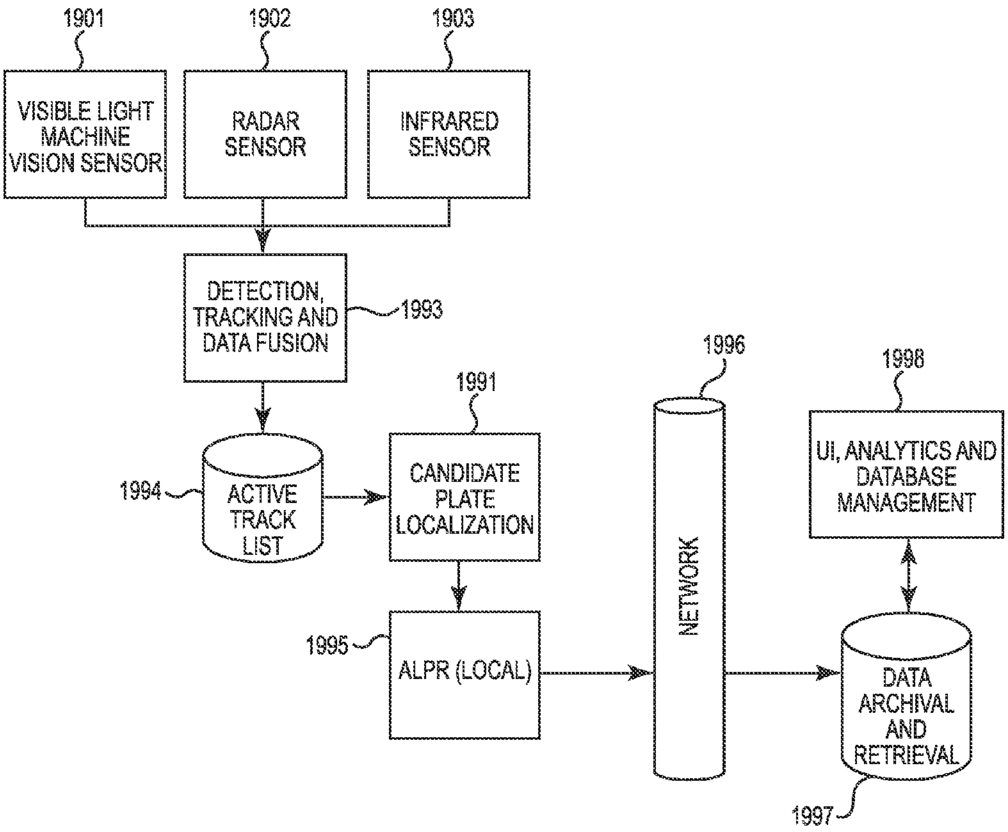
FIG. 19 is a schematic block diagram of an embodiment of local processing of ALPR information according to the present disclosure.

FIG. 19 is a schematic block diagram of an embodiment of local processing of ALPR information according to the present disclosure. In various embodiments, output from a plurality of sensors can be input to a detection, tracking, and data fusion functionality 1993 (e.g., that operates by execution of machine-executable instructions stored on a non-transitory machine-readable medium to include a combination of the functionalities described elsewhere herein). In some embodiments, input from a visible light machine vision sensor 1901 (e.g., camera and/or video), a radar sensor 1902, and an IR sensor 1903 can be input to the detection, tracking, and data fusion functionality 1993. A fused track object obtained from the input from the visible light machine vision sensor 1901 and the radar sensor 1902, along with the IR sensor data, can be output to an active track list 1994 that can be accessed by a candidate plate location 1991 functionality that enables a resultant image clip to be processed by an APPR functionality 1995. In local processing, the aforementioned functionalities, sensors, etc., are located within the vicinity of the roadway being monitored (e.g., possibly within the same integrated assembly).

Data including the detection, tracking, and data fusion, along with identification of a particular vehicle obtained through ALPR processing, can thus be stored in the vicinity of the of the roadway being monitored. Such data can subsequently be communicated through a network 1996 (e.g., by hardwire, wirelessly and/or through the cloud) to, for example, public safety agencies. Such data can be stored by a data archival and retrieval functionality 1997 from which the data is accessible by a user interface (UI) for analytics and/or management 1998.

Figure 20:
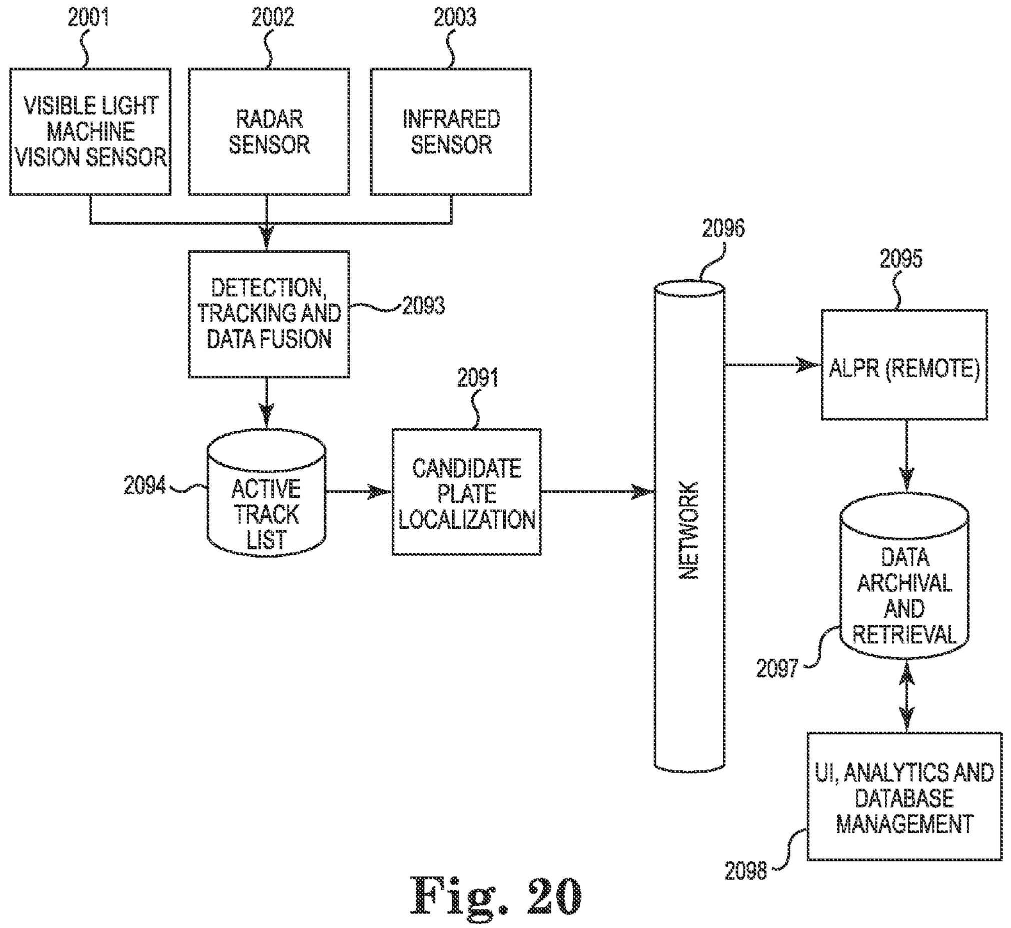
FIG. 20 is a schematic block diagram of an embodiment of remote processing of ALPR information according to the present disclosure.

FIG. 20 is a schematic block diagram of an embodiment of remote processing of ALPR information according to the present disclosure. In this embodiment, the ALPR functionality 2095 can be running on a remote server (e.g., cloud based processing) accessed through the network 2096, where the ALPR functionality 2095 can be run either in real time or off line as a daily batch processing procedure. The multi-sensor system is able to reduce network bandwidth requirements through transmitting only the image region of interest where the candidate plate resides (e.g., as shown in FIG. 18). This reduction in bandwidth can result in a system that is scalable to a large number of networked systems. Another advantage to the cloud based processing is centralization of privacy sensitive information.

In the local processing embodiment described with regard to FIG. 19, license plate information is determined at the installation point, resulting in the transfer of time stamped detailed vehicle information over the network connection 1996. While proper encryption of data can secure the information, there exists the possibility of network intrusion and/or unauthorized data collection. A remote cloud based ALPR configuration 2095 is able to reduce the security concerns though network 2096 transmission of image clips (e.g., as shown at 1892 in FIG. 18) only. Another advantage to a cloud based solution is that the sensitive information can be created under the control of the government agency and/or municipality. This can reduce data retention policies and/or requirements on the sensor system proper. Yet another advantage of remote processing is the ability to aggregate data from disparate sources, to include public and/or private surveillance systems, for near real time data fusion and/or analytics.

Figure 21:
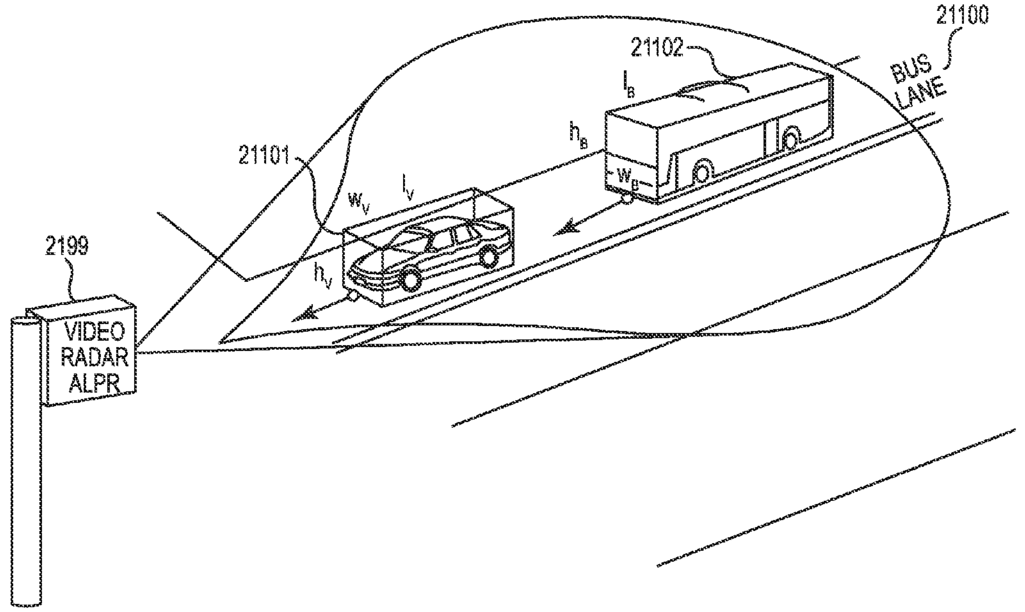
FIG. 21 is a schematic illustration of an example of triggering capture of ALPR information based on detection of vehicle characteristics according to the present disclosure.

FIG. 21 is a schematic illustration of an example of triggering capture of ALPR information based on detection of vehicle characteristics according to the present disclosure. The ALPR enhanced multi-sensor platform 2199 leverages vehicle classification information (e.g., vehicle size based upon, for instance, a combination of height (h), width (w), and/or length (l)) to identify and/or capture traffic violations in restricted vehicle lanes. One example is monitoring vehicle usage in a restricted bus lane 21100 to detect and/or identify the vehicles unauthorized to use the lane. In this embodiment, video based detection and/or tracking can be leveraged to determine vehicle lane position and/or size based vehicle classification. In the event that an unauthorized vehicle (e.g., a passenger vehicle 21101) is detected in the restricted bus lane 21100, based on size information distinguishable from information associated with a bus 21102, candidate plate locations can be identified and/or sent to the ALPR detection service. The ALPR processing can be resident on the sensor platform, with data delivery to end user back office data logging, or the image clip could be compressed and/or sent to end user hosted ALPR processing. Vehicle detection and/or tracking follows the design pattern described herein. Vehicle classification can be derived from vehicle track spatial extent, leveraging calibration information to calculate real-world distances from the pixel based track state estimates.

FIG. 21 depicts an unauthorized passenger vehicle 21101 traveling in the bus lane 21100. The ALPR enhanced multi-sensor platform 2199 can conduct detection, tracking, and/or classification as described in previous embodiments. Size based classification can provide a trigger to capture the unauthorized plate information, which can be processed either locally or remotely.

An extension of previous embodiments is radar based speed detection with supporting vehicle identification information coming from the ALPR and visible light video sensors. In this embodiment, the system would be configured to trigger vehicle identification information upon detection of vehicle speeds exceeding the posted legal limit. Vehicle identification information includes an image of the vehicle and license plate information. Previously defined detection and/or tracking mechanisms are relevant to this embodiment, with the vehicle speed information provided by the radar sensor.

A typical intersection control centric detection system's region of interest starts near the approach stop line (e.g., the crosswalk), and extends down lane 600 feet and beyond. Sensor constraints tend to dictate the FOV. Forward fired radar systems benefit from an installation that aligns the transducer face with the approaching traffic lane, especially in the case of Doppler based systems. ALPR systems also benefit from a head-on vantage point, as it can reduce skew and/or distortion of the license plate image clip. Both of the aforementioned sensor platforms have range limitations based on elevation angle (e.g., how severely the sensor is aimed in the vertical dimension so as to satisfy the primary detection objective). Since vehicle detection at extended ranges is often desired, a compromise is often made between including the intersection proper in the FOV and/or observation of down range objects.

Figure 22:
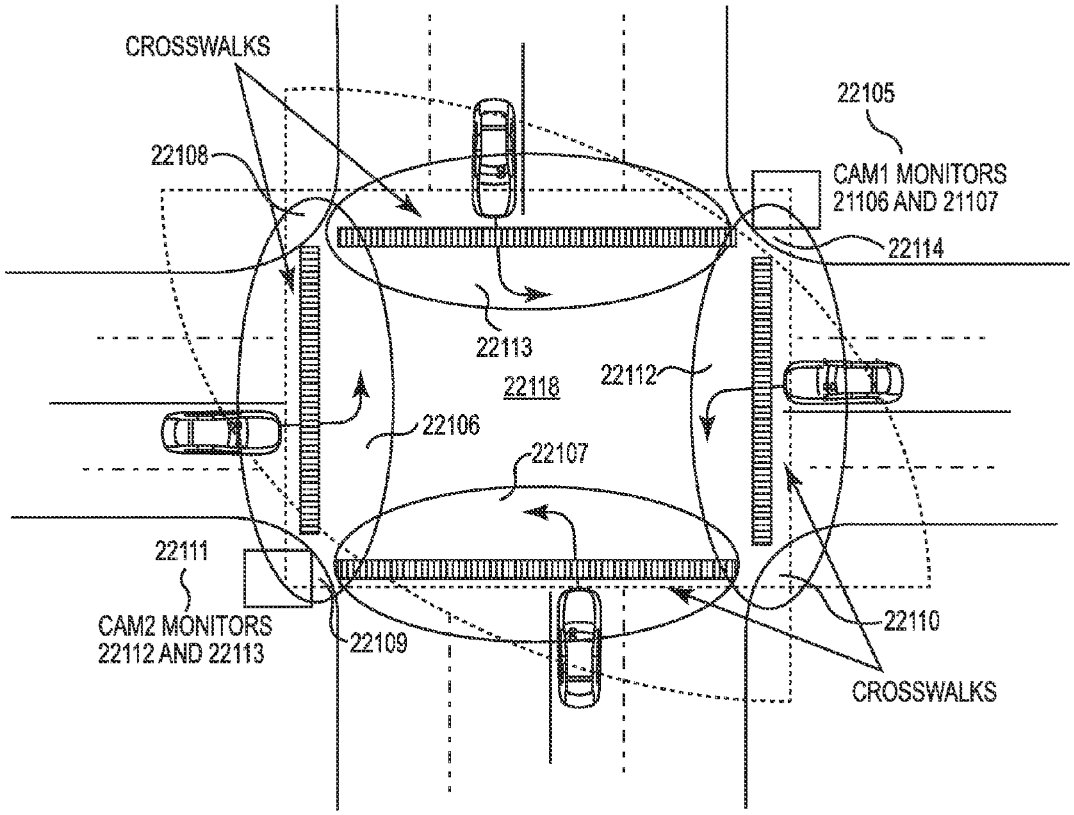
FIG. 22 is a schematic illustration of an example of utilization of wide angle field of view sensors according to the present disclosure.

FIG. 22 is a schematic illustration of an example of utilization of wide angle field of view sensors according to the present disclosure. The proposed embodiment leverages a wide angle FOV video sensor as a means to address surveillance and/or detection in the regions not covered by traditional above ground sensors. The wide angle FOV sensor can be installed, for example, at a traffic signal pole and/or a lighting pole such that it is able to view the two opposing crosswalk regions, street corners, in addition to the intersection. For example, as shown in FIG. 22, wide angle FOV sensor CAM 1 shown at 22105 can monitor crosswalks 22106 and 22107, and regions near and/or associated with the crosswalks, along with the three corners 22108, 22109, and 22110 contiguous to these crosswalks and wide angle FOV sensor CAM 2 shown at 22111 can monitor crosswalks 22112 and 22113 along with the three corners contiguous to these crosswalks 22108, 22114, and 22110 at an intersection 22118. This particular installation configuration allows the sensor to observe the pedestrians from a side view, increasing the motion based detection objectives. Sensor optics and/or installation can be configured to alternatively view the adjacent crosswalks, allowing for additional pixels on target while sacrificing visual motion characteristics. Potentially obstructive debris in the region of the intersection, crosswalks, sidewalks, etc., can also be detected.

The wide angle FOV sensors can either be integrated into a single sensor platform alongside radar and ALPR or installed separately from the other sensors. Detection processing can be local to the sensor, with detection information passed to an intersection specific access point for aggregation and/or delivery to the traffic controller. In various embodiments, the embodiment can utilize a segmentation and/or tracking functionality, and/or with a functionality for lens distortion correction (e.g., unwrapping) of a 180 degree and/or omnidirectional image.

V2V and V2I communication has increasingly become a topic of interest at the Federal transportation level, and will likely influence the development and/or deployment of in-vehicle communication equipment as part of new vehicle offerings. The multi-sensor detection platform described herein can create information to effectuate both the V2V and V2I initiatives.

Figure 23:
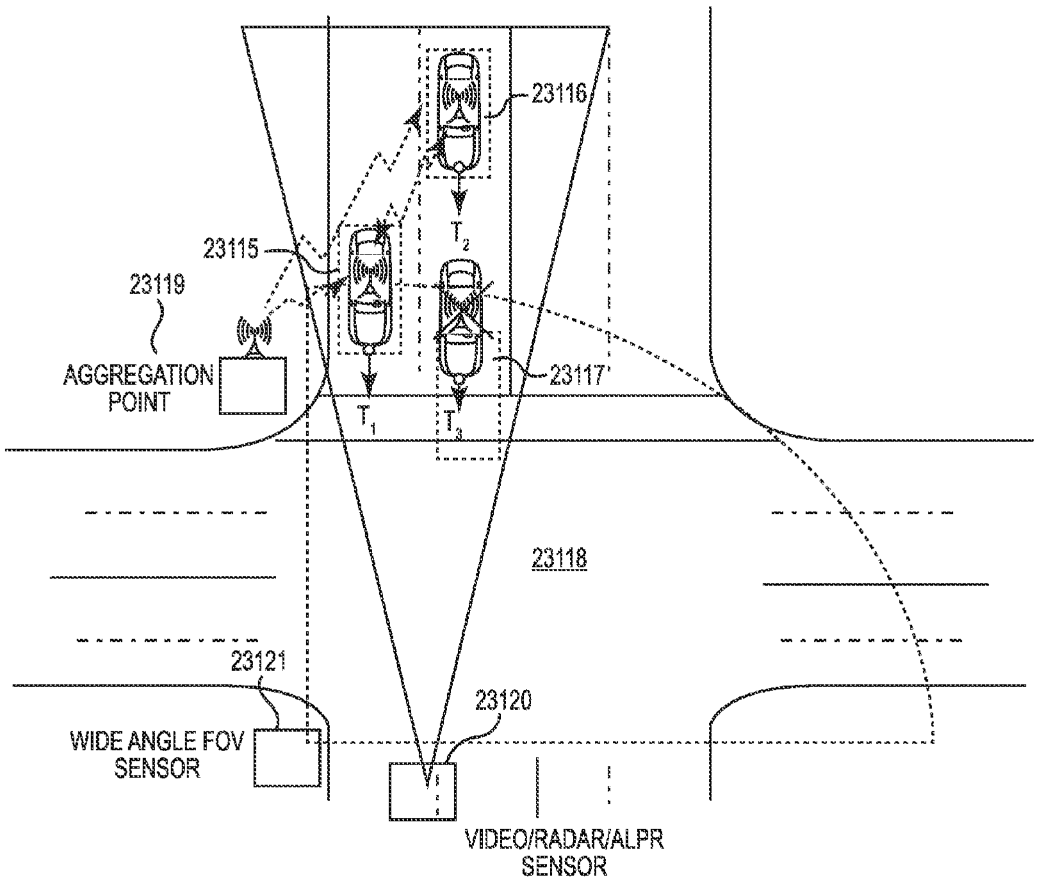
FIG. 23 is a schematic illustration of an example of utilization of wide angle field of view sensors in a system for communication of vehicle behavior information to vehicles according to the present disclosure.

FIG. 23 is a schematic illustration of an example of utilization of wide angle field of view sensors in a system for communication of vehicle behavior information to vehicles according to the present disclosure. In some embodiments, the individual vehicle detection and/or tracking capabilities of the system can be leveraged as a mechanism to provide instrumented vehicles with information about non-instrumented vehicles. An instrumented vehicle contains the equipment to self-localize (e.g., using global positioning systems (GPS)) and to communicate (e.g., using radios) their position and/or velocity information to other vehicles and/or infrastructure. A non-instrumented vehicle is one that lacks this equipment and is therefore incapable of communicating location and/or velocity information to neighboring vehicles and/or infrastructure.

FIG. 23 illustrates a representation of three vehicles, that is, $T_1$ shown at 23115, $T_2$ shown at 23116, and $T_3$ and shown at 23117 traveling through an intersection 23118 that is equipped with the communications equipment to communicate with instrumented vehicles. Of the three vehicles, $T_1$ and $T_2$ are able to communicate with each other, in addition to the infrastructure (e.g., the aggregation point 23119). $T_3$ lacks the communication equipment and, therefore, is not enabled to share such information. The system described herein can provide individual vehicle tracks, in real world coordinates from the sensors (e.g., the multi-sensor video/radar/ALPR 23120 combination and/or the wide angle FOV sensor 23121), which can then be relayed to the instrumented vehicles $T_1$ and $T_2$.

Prior to transmission of the vehicle information, processing can take place at the aggregation point 23119 (e.g., an intersection control cabinet) to evaluate the sensor produced track information against the instrumented vehicle provided location and/or velocity information as a mechanism to filter out information already known by the instrumented vehicles. The unknown vehicle $T_3$ state information, in this instance, can be transmitted to the instrumented vehicles (e.g., vehicles $T_1$ and $T_2$) so that they can include the vehicle in their neighboring vehicle list. Another benefit to this approach is that information about non-instrumented vehicles (e.g., vehicle $T_3$) can be collected at the aggregation point 23119, alongside the information from the instrumented vehicles, to provide a comprehensive list of vehicle information in support of data collection metrics to, for example, federal, state, and/or local governments to evaluate success of the V2V and/or V2I initiatives.

Figure 24:
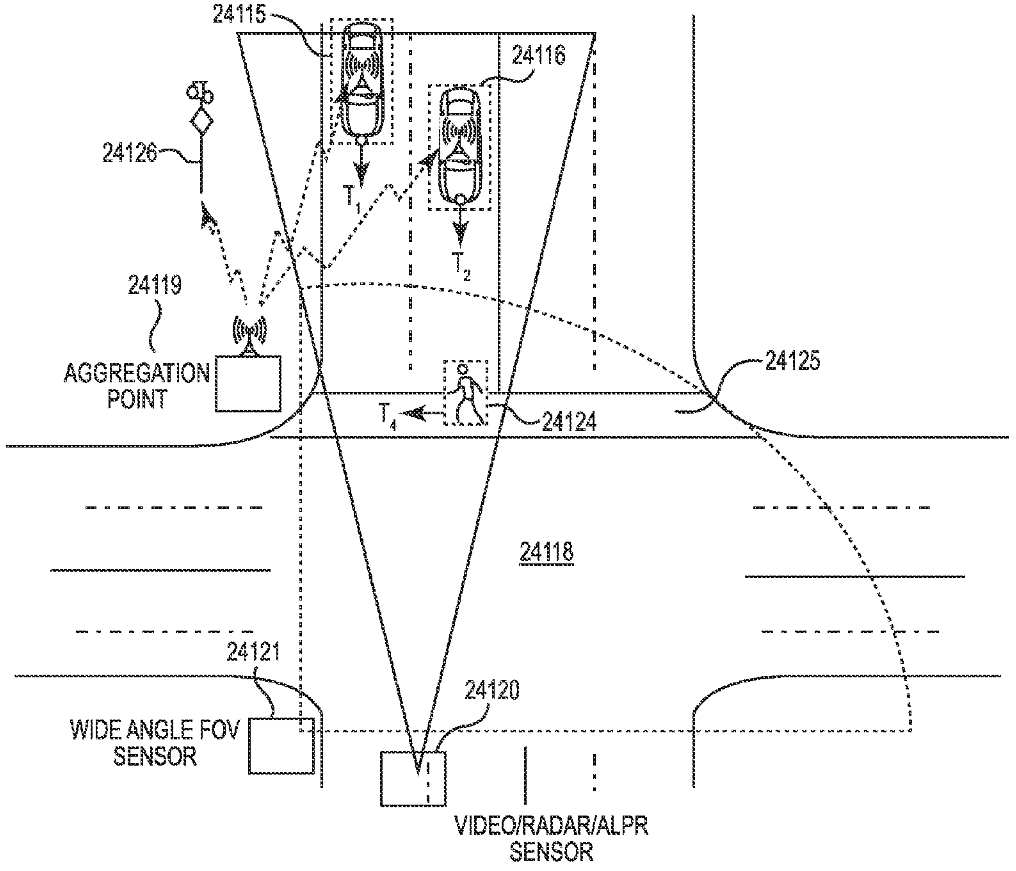
FIG. 24 is a schematic illustration of an example of utilization of wide angle field of view sensors in a system for communication of information about obstructions to vehicles according to the present disclosure.

FIG. 24 is a schematic illustration of an example of utilization of wide angle field of view sensors in a system for communication of information about obstructions to vehicles according to the present disclosure. FIG. 24 illustrates the ability of the system, in some embodiments, to detect objects that are within tracked vehicles' anticipated (e.g., predicted) direction of travel. For example, FIG. 24 indicates that a pedestrian $T_4$ shown at 24124 has been detected crossing a crosswalk 24125, while tracked vehicle $T_1$ shown at 24115 and tracked vehicle $T_2$ shown at 24116 are approaching the intersection 24118. This information would be transmitted to the instrumented vehicles by the aggregation point 24119, as described herein, and/or can be displayed on variable message and/or dedicated pedestrian warning signs 24126 installed within view of the intersection. This concept can be extended to debris and/or intersection incident detection (e.g., stalled vehicles, accidents, etc.).

Figure 25:
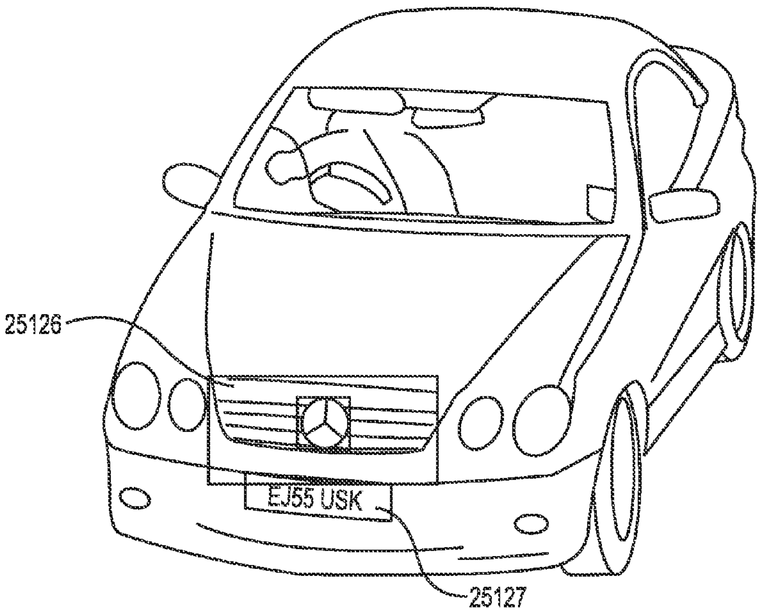
FIG. 25 is a schematic illustration of an example of isolation of vehicle make, model, and color indicators based upon license plate localization according to the present disclosure.

FIG. 25 is a schematic illustration of an example of isolation of vehicle make, model, and/or color (MMC) indicators 25126 based upon license plate localization 25127 according to the present disclosure. ALPR implementation has the ability to operate in conjunction with other sensor modalities that determine vehicle MMC of detected vehicles. MMC is a soft vehicle identification mechanism, and as such, does not offer as definitive identification as a complete license plate read. One instance where this information can be of value is in ALPR instrumented parking lot systems, where an authorized vehicle list is referenced upon vehicle entry. In the case of a partial plate read (e.g., one or more characters are not recognized), the detection of one or more of the MMC indicators 25126 of the vehicle can be used to filter the list of authorized vehicles and associate the partial plate read with the MMC, thus enabling automated association of the vehicle to the reference list without complete plate read information.

Figure 26:
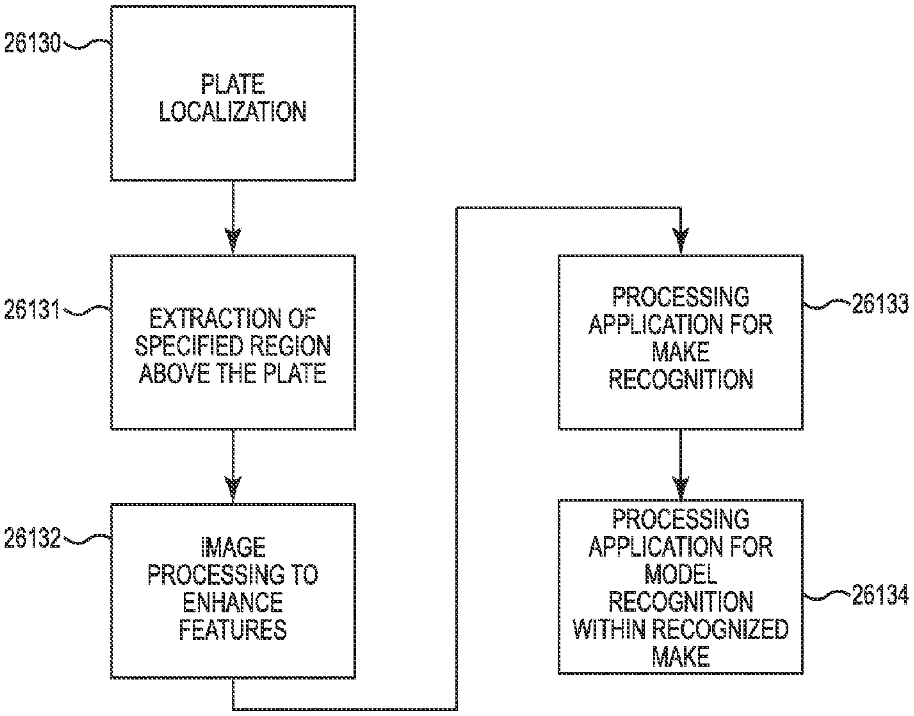
FIG. 26 is a schematic block diagram of an embodiment of processing to determine a particular make and model of a vehicle based upon detected make, model, and color indicators according to the present disclosure.

FIG. 26 is a schematic block diagram of an embodiment of processing to determine a particular make and model of a vehicle based upon detected make, model, and color indicators according to the present disclosure. The system described herein can use the information about the plate localization 26130 from ALPR engine (e.g., position, size, and/or angle) to specify the regions of interest, where, for example, a grill, a badge, and/or icon, etc., could be expected. Such a determination can direct, for example, extraction of an image from a specified region above the license plate 26131. The ALPR engine can then extract the specified region and, in some embodiments, normalize the image of the region (e.g., resize and/or deskew). For a proper region specification, system may be configured (e.g., automatically or manually) to position and/or angle a camera and/or video sensor.

Extracted images can be processed by a devoted processing application. In some embodiments, the processing application first can be used to identify a make of the vehicle 26133 (e.g., Ford, Chevrolet, Toyota, Mercedes, etc.), for example, using localized badge, logo, icon, etc., in the extracted image. If the make is successfully identified, the same or a different processing application can be used for model recognition 26134 (e.g., Ford Mustang®, Chevrolet Captiva®, Toyota Celica®, Mercedes GLK350®, etc.) within the recognized make. This model recognition can, for example, be based on front grills using information about grills usually differing between the different models of the same make. In case a first attempt is unsuccessful, the system can apply particular information processing functions to the extracted image in order to enhance the quality of desired features 26132 (e.g., edges, contrast, color differentiation, etc.). Such an adjusted image can again be processed by the processing applications for classification of the MMC information.

Consistent with the description provided in the present disclosure, an example of roadway sensing is an apparatus to detect and/or track objects at a roadway with a plurality of sensors. The plurality of sensors can include a first sensor that is a radar sensor having a first FOV that is positionable at the roadway and a second sensor that is a machine vision sensor having a second FOV that is positionable at the roadway, where the first and second FOVs at least partially overlap in a common FOV over a portion of the roadway. The example apparatus includes a controller configured to combine sensor data streams for at least a portion of the common FOV from the first and second sensors to detect and/or track the objects.

In various embodiments, two different coordinate systems for at least a portion of the common FOV of the first sensor and the second sensor can be transformed to a homographic matrix by correspondence of points of interest between the two different coordinate systems. In some embodiments, the correspondence of the points of interest can be performed by at least one synthetic target generator device positioned in the coordinate system of the radar sensor being correlated to a position observed for the at least one synthetic target generator device in the coordinate system of the machine vision sensor. Alternatively, in some embodiments, the correspondence of the points of interest can be performed by an application to simultaneously accept a first data stream from the radar sensor and a second data stream from the machine vision sensor, display an overlay of at least one detected point of interest in the different coordinate systems of the radar sensor and the machine vision sensor, and to enable alignment of the points of interest. In some embodiments, the first and second sensors can be located adjacent to one another (e.g., in an integrated assembly) and can both be commonly supported by a support structure.

Consistent with the description provided in the present disclosure, various examples of roadway sensing systems are described. An embodiment of such is a system to detect and/or track objects in a roadway area that includes a radar sensor having a first FOV as a first sensing modality that is positionable at a roadway, a first machine vision sensor having a second FOV as a second sensing modality that is positionable at the roadway, and a communication device configured to communicate data from the first and second sensors to a processing resource. In some embodiments, the processing resource can be cloud based processing.

In some embodiments, the second FOV of the first machine vision sensor (e.g., a visible light and/or IR light sensor) can have a horizontal FOV of 100 degrees or less. In some embodiments, the system can include a second machine vision sensor having a wide angle horizontal FOV that is greater than 100 degrees (e.g., omnidirectional or 180 degree FOV visible and/or IR light cameras and/or videos) that is positionable at the roadway.

In some embodiments described herein, the radar sensor and the first machine vision sensor can be collocated in an integrated assembly and the second machine vision sensor can be mounted in a location separate from the integrated assembly and communicates data to the processing resource. In some embodiments, the second machine vision sensor having the wide angle horizontal FOV can be a third sensing modality that is positioned to simultaneously detect a number of objects positioned within two crosswalks and/or a number of objects traversing at least two stop lines at an intersection.

In various embodiments, at least one sensor selected from the radar sensor, the first machine vision sensor, and the second machine vision sensor can be configured and/or positioned to detect and/or track objects within 100 to 300 feet of a stop line at an intersection, a dilemma zone up to 300 to 600 feet distal from the stop line, and an advanced zone greater that 300 to 600 feet distal from the stop line. In some embodiments, at least two sensors in combination can be configured and/or positioned to detect and/or track objects simultaneously near the top line, in the dilemma zone, and in the advanced zone.

In some embodiments, the system can include an ALPR sensor that is positionable at the roadway and that can sense visible and/or IR light reflected and/or emitted by a vehicle license plate. In some embodiments, the ALPR sensor can capture an image of a license plate as determined by input from at least one of the radar sensor, a first machine vision sensor having the horizontal FOV of 100 degrees or less, and/or the second machine vision sensor having the wide angle horizontal FOV that is greater than 100 degrees. In some embodiments, the ALPR sensor can be triggered to capture an image of a license plate upon detection of a threshold number of pixels associated with the license plate. In some embodiments, the radar sensor, the first machine vision sensor, and the ALPR can be collocated in an integrated assembly that communicates data to the processing resource via the communication device.

Consistent with the description provided in the present disclosure, a non-transitory machine-readable medium can store instructions executable by a processing resource to detect and/or track objects in a roadway area (e.g., objects in the roadway, associated with the roadway and/or in the vicinity of the roadway). Such instructions can be executable to receive data input from a first discrete sensor type (e.g., a first modality) having a first sensor coordinate system and receive data input from a second discrete sensor type (e.g., a second modality) having a second sensor coordinate system. The instructions can be executable to assign a time stamp from a common clock to each of a number of putative points of interest in the data input from the first discrete sensor type and the data input from the second discrete sensor type and to determine a location and motion vector for each of the number of putative points of interest in the data input from the first discrete sensor type and the data input from the second discrete sensor type. The instructions can be executable to match multiple pairs of the putative points of interest in the data input from the first discrete sensor type and the data input from the second discrete sensor type based upon similarity of the assigned time stamps and the location and motion vectors to determine multiple matched points of interest and to compute a two dimensional homography between the first sensor coordinate system and the second sensor coordinate system based on the multiple matched points of interest.

In some embodiments, the instructions can be executable to calculate a first probability of accuracy of an object attribute detected by the first discrete sensor type by a first numerical representation of the attribute for probability estimation, calculate a second probability of accuracy of the object attribute detected by the second discrete sensor type by a second numerical representation of the attribute for probability estimation, and fuse the first probability and the second probability of accuracy of the object attribute to provide a single estimate of the accuracy of the object attribute. In some embodiments, the instructions can be executable to estimate a probability of presence and/or velocity of a vehicle by fusion of the first probability and the second probability of accuracy to the single estimate of the accuracy. In some embodiments, the first discrete sensor type can be a radar sensor and the second discrete sensor type can be a machine vision sensor.

In some embodiments, the numerical representation of the first probability and the numerical representation of the second probability of accuracy of presence and/or velocity of the vehicle can be dependent upon a sensing environment. In various embodiments, the sensing environment can be dependent upon sensing conditions in the roadway area that include at least one of presence of shadows, daytime and nighttime lighting, rainy and wet road conditions, contrast, FOV occlusion, traffic density, lane type, sensor-to-object distance, object speed, object count, object presence in a selected area, turn movement detection, object classification, sensor failure, and/or communication failure, among other conditions that can affect accuracy of sensing.

In some embodiments as described herein, the instructions can be executable to monitor traffic behavior in the roadway area by data input from at least one of the first discrete sensor type and the second discrete sensor type related to vehicle position and/or velocity, compare the vehicle position and/or velocity input to a number of predefined statistical models of the traffic behavior to cluster similar traffic behaviors, and if incoming vehicle position and/or velocity input does not match at least one of the number of predefined statistical models, generate a new model to establish a new pattern of traffic behavior. In some embodiments as described herein, the instructions can be executable to repeatedly receive the data input from at least one of the first discrete sensor type and the second discrete sensor type related to vehicle position and/or velocity, classify lane types and/or geometries in the roadway area based on vehicle position and/or velocity orientation within one or more model, and predict behavior of at least one vehicle based on a match of the vehicle position and/or velocity input with at least one model.

Although described with regard to roadways for the sake of brevity, embodiments described herein are applicable to any route traversed by fast moving, slow moving, and stationary objects (e.g., motorized and human-powered vehicles, pedestrians, animals, carcasses, and/or inanimate debris, among other objects). In addition to routes being inclusive of the parking facilities, crosswalks, intersections, streets, highways, and/or freeways ranging from a particular locale, city wide, regionally, to nationally, among other locations, described as "roadways" herein, such routes can include indoor and/or outdoor pathways, hallways, corridors, entranceways, doorways, elevators, escalators, rooms, auditoriums, stadiums, among many other examples, accessible to motorized and human-powered vehicles, pedestrians, animals, carcasses, and/or inanimate debris, among other objects.

The figures herein follow a numbering convention in which the first digit or digits correspond to the figure number and the remaining digits identify an element or component in the drawing. Similar elements or components between different figures may be identified by the use of similar digits. For example, 114 may reference element "14" in FIG. 1, and a similar element may be referenced as 214 in FIG. 2. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

As used herein, the data processing and/or analysis can be performed using machine-executable instructions (e.g., computer-executable instructions) stored on a non-transitory machine-readable medium (e.g., a computer-readable medium), the instructions being executable by a processing resource. "Logic" is an alternative or additional processing resource to execute the actions and/or functions, etc., described herein, which includes hardware (e.g., various forms of transistor logic, application specific integrated circuits (ASICs), etc.), as opposed to machine-executable instructions (e.g., software, firmware, etc.) stored in memory and executable by a processor.

As described herein, plurality of storage volumes can include volatile and/or non-volatile storage (e.g., memory). Volatile storage can include storage that depends upon power to store information, such as various types of dynamic random access memory (DRAM), among others. Non-volatile storage can include storage that does not depend upon power to store information. Examples of non-volatile storage can include solid state media such as flash memory, electrically erasable programmable read-only memory (EEPROM), phase change random access memory (PCRAM), magnetic storage such as a hard disk, tape drives, floppy disk, and/or tape storage, optical discs, digital versatile discs (DVD), Blu-ray discs (BD), compact discs (CD), and/or a solid state drive (SSD), etc., in addition to other types of machine readable media.

In view of the entire present disclosure, persons of ordinary skill in the art will appreciate that the present disclosure provides numerous advantages and benefits over the prior art. Any relative terms or terms of degree used herein, such as "about", "approximately", "substantially", "essentially", "generally" and the like, should be interpreted in accordance with and subject to any applicable definitions or limits expressly stated herein. Any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment variations induced operational conditions, incidental signal noise, and the like. As used herein, "a", "at least one", or "a number of" an element can refer to one or more such elements. For example, "a number of widgets" can refer to one or more widgets. Further, where appropriate, "for example" and "by way of example" should be understood as abbreviations for "by way of example and no by way of limitation".

Elements shown in the figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

While the disclosure has been described for clarity with reference to particular embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the present disclosure. For example, embodiments described in the present disclosure can be performed in conjunction with methods or process steps not specifically shown in the accompanying drawings or explicitly described above. Moreover, certain process steps can be performed concurrent or in different orders than explicitly those disclosed herein.

What is claimed:

1. An apparatus to detect or track objects at a roadway, the apparatus comprising:

a plurality of sensors, comprising a first sensor that is a radar sensor having a first field of view that is installed at a stationary position in association with a roadway and a second sensor that is a machine vision sensor having a second field of view that is installed at a collocated stationary position in association with the roadway, wherein the first and second fields of view at least partially overlap in a common field of view over a portion of the roadway; and a controller configured to combine sensor data streams for at least a portion of the common field of view from the first and second sensors to detect or track objects.

2. The apparatus of claim 1, comprising two different coordinate systems for at least a portion of the common field of view of the first sensor and the second sensor that are transformed to a homographic matrix by correspondence of points of interest between the two different coordinate systems.

3. The apparatus of claim 2, wherein the correspondence of the points of interest comprises at least one synthetic target generator device positioned in the coordinate system of the radar sensor that is correlated to a position observed for the at least one synthetic target generator device in the coordinate system of the machine vision sensor.

4. The apparatus of claim 2, wherein the correspondence of the points of interest comprises an application to simultaneously accept a first data stream from the radar sensor and a second data stream from the machine vision sensor, display an overlay of at least one detected point of interest in the different coordinate systems of the radar sensor and the machine vision sensor, and to enable alignment of the points of interest.

5. The apparatus of claim 1, wherein the first and second sensors are collocated adjacent to one another and are both commonly supported by a stationary support structure installed in association with the roadway.

6. A system to detect or track objects in a roadway area, comprising:

a radar sensor having a first field of view as a first sensing modality that is installed at a stationary position in association with a roadway;

a first machine vision sensor having a second field of view as a second sensing modality that is installed at a collocated stationary position in association with the roadway; and a communication device configured to communicate data from the first and second sensors to a processing resource that is remote from the collocated first and second sensors.

7. The system of claim 6, wherein the processing resource comprises cloud based processing.

8. The system of claim 6, wherein the second field of view of the first machine vision sensor has a horizontal field of view of 100 degrees or less.

9. The system of claim 6, comprising a second machine vision sensor having a wide angle horizontal field of view that is greater than 100 degrees that is positionable at the roadway.

10. The system of claim 9, wherein the second machine vision sensor having the wide angle horizontal field of view is a third sensing modality that is positioned to simultaneously detect a number of objects positioned within two crosswalks or a number of objects traversing at least two stop lines at an intersection.

11. The system of claim 9, wherein at least one sensor selected from the radar sensor, the first machine vision sensor, and the second machine vision sensor is configured or positioned to detect and track objects within 100 to 300 feet of a stop line at an intersection, a dilemma zone up to 300 to 600 feet distal from the stop line, and an advanced zone greater that 300 to 600 feet distal from the stop line.

12. The system of claim 10, wherein the radar sensor and the first machine vision sensor are collocated in an integrated assembly and the second machine vision sensor is mounted in a location separate from the integrated assembly and communicates data to the processing resource.

13. The system of claim 6, comprising an automatic license plate recognition (ALPR) sensor that is positionable at the roadway and that senses visible or infrared light reflected or emitted by a vehicle license plate.

14. The system of claim 13, wherein the radar sensor, the first machine vision sensor, and the ALPR are collocated in an integrated assembly that communicates data to the processing resource via the communication device.

15. The system of claim 13, wherein the ALPR sensor captures an image of a license plate as determined by input from at least one of the radar sensor, a first machine vision sensor having the horizontal field of view of 100 degrees or less, and the second machine vision sensor having the wide angle horizontal field of view that is greater than 100 degrees.

16. A non-transitory machine-readable medium storing instructions executable by a processing resource to detect or track objects in a roadway area, the instructions executable to:

receive data input from a first discrete sensor type having a first sensor coordinate system;

receive data input from a second discrete sensor type having a second sensor coordinate system;

assign a time stamp from a common clock to each of a number of putative points of interest in the data input from the first discrete sensor type and the data input from the second discrete sensor type;

determine a location and motion vector for each of the number of putative points of interest in the data input from the first discrete sensor type and the data input from the second discrete sensor type;

match multiple pairs of the putative points of interest in the data input from the first discrete sensor type and the data input from the second discrete sensor type based upon similarity of the assigned time stamps and the location and motion vectors to determine multiple matched points of interest; and compute a two-dimensional homography between the first sensor coordinate system and the second sensor coordinate system based on the multiple matched points of interest.

17. The medium of claim 16, the instructions further executable to:

calculate a first probability of accuracy of an object attribute detected by the first discrete sensor type by a first numerical representation of the attribute for probability estimation;

calculate a second probability of accuracy of the object attribute detected by the second discrete sensor type by a second numerical representation of the attribute for probability estimation; and fuse the first probability and the second probability of accuracy of the object attribute to provide a single estimate of the accuracy of the object attribute.

18. The medium of claim 17, the instructions further executable to:

estimate a probability of presence or velocity of a vehicle by fusion of the first probability and the second probability of accuracy to the single estimate of the accuracy, wherein the first discrete sensor type is a radar sensor and the second discrete sensor type is a machine vision sensor and wherein the numerical representation of first probability and the numerical representation of second probability of accuracy of presence or velocity of the vehicle are dependent upon the sensing environment.

19. The medium of claim 16, the instructions further executable to:

monitor traffic behavior in the roadway area by data input from at least one of the first discrete sensor type and the second discrete sensor type related to vehicle position and velocity;

compare the vehicle position and velocity input to a number of predefined statistical models of the traffic behavior to cluster similar traffic behaviors; and if incoming vehicle position and velocity input does not match at least one of the number of predefined statistical models, generate a new model to establish a new pattern of traffic behavior.

20. The medium of claim 19, the instructions further executable to:

repeatedly receive the data input from at least one of the first discrete sensor type and the second discrete sensor type related to vehicle position and velocity;

classify lane types or geometries in the roadway area based on vehicle position and velocity orientation within one or more model; and predict behavior of at least one vehicle based on a match of the vehicle position and velocity input with at least one model.

* * * * *